US012160876B2

(12) United States Patent
Takeda et al.

(10) Patent No.: US 12,160,876 B2
(45) Date of Patent: Dec. 3, 2024

(54) SIMULTANEOUS Rx/Tx FOR MULTIPLE CARRIERS

(71) Applicant: QUALCOMM Incorporated, San Diego, CA (US)

(72) Inventors: Kazuki Takeda, Tokyo (JP); Peter Gaal, San Diego, CA (US); Masato Kitazoe, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 736 days.

(21) Appl. No.: 17/220,146

(22) Filed: Apr. 1, 2021

(65) Prior Publication Data
US 2022/0322331 A1    Oct. 6, 2022

(51) Int. Cl.
*H04W 72/51* (2023.01)
*H04W 72/0453* (2023.01)
(Continued)

(52) U.S. Cl.
CPC .......... *H04W 72/51* (2023.01); *H04W 72/21* (2023.01); *H04W 72/0453* (2013.01); *H04W 88/06* (2013.01)

(58) Field of Classification Search
CPC . H04W 72/51; H04W 72/21; H04W 72/0453; H04W 88/06; H04W 8/22;
(Continued)

(56) References Cited

U.S. PATENT DOCUMENTS 6,286,104 B1 * 9/2001 Buhle .................. H04L 63/105
                                                        707/999.009
11,006,425 B2 * 5/2021 Xiong ............... H04W 72/0446
(Continued)

FOREIGN PATENT DOCUMENTS

WO    2020198416 A1    10/2020

OTHER PUBLICATIONS

3GPP TS 38.331 V16.4.0: "3rd Generation Partnership Project, Technical Specification Group Radio Access Network, NR, Radio Resource Control (RRC) Protocol Specification (Release 16)", 3gpp Standard, Technical Specification, 3rd Generation Partnership Project, Mobile Competence Centre, 650, Route Des Lucioles, F-06921 Sophia-Antipolis Cedex, France, vol. RAN WG2, No., Mar. 30, 2021, 949 Pages, XP052000245, pp. 670-716.
(Continued)

*Primary Examiner* — Brian T O Connor
(74) *Attorney, Agent, or Firm* — Paul M. McAdams; Polsinelli LLP

(57) ABSTRACT

The base station may receive a first indication that the UE supports NR-CA with multiple PUCCH groups or NR-DC with multiple cell groups and a second indication that the UE does not support simultaneous Rx/Tx in a first frequency band and a second frequency band, and schedule communication with the UE to avoid scheduling the simultaneous Rx/Tx based on the first and second indications. The base station may avoid scheduling simultaneous Rx/Tx in a first cell group or a first PUCCH group including the first frequency band and a second cell group or a second PUCCH group including the second frequency band. The UE may skip reporting to the base station that the UE supports the NR-DC or the NR-CA with the first frequency band and the second frequency band.

36 Claims, 16 Drawing Sheets

(51) Int. Cl.
*H04W 72/21* (2023.01)
*H04W 88/06* (2009.01)

(58) Field of Classification Search
CPC . H04W 76/15; H04W 72/23; H04W 74/0833; H04W 72/044; H04L 5/001; H04L 1/1812; H04L 5/0055; H04L 5/0048; H04L 1/1822; H04L 5/0007; H04L 27/2601; H04L 5/0053; H04L 5/0091; H04L 5/0032; H04L 1/0072; H04L 1/08; H04L 5/0064; H04B 7/0695
See application file for complete search history.

(56) References Cited

U.S. PATENT DOCUMENTS

| | | | | |
|---|---|---|---|---|
| 11,617,206 | B2* | 3/2023 | Lin | H04L 5/0057 370/329 |
| 11,943,763 | B2* | 3/2024 | Lin | H04W 72/1268 |
| 2021/0153262 | A1* | 5/2021 | Mochizuki | H04W 56/0045 |
| 2022/0007405 | A1* | 1/2022 | Takeda | H04L 5/14 |
| 2022/0174715 | A1* | 6/2022 | Zhang | H04W 72/23 |
| 2022/0191858 | A1* | 6/2022 | Cui | H04L 5/0053 |
| 2022/0312405 | A1* | 9/2022 | Sun | H04L 27/26025 |
| 2023/0052706 | A1* | 2/2023 | Takada | H04W 24/10 |
| 2023/0188306 | A1* | 6/2023 | Nory | H04W 72/1268 370/330 |
| 2023/0199836 | A1* | 6/2023 | Lin | H04L 5/0057 370/329 |
| 2024/0080878 | A1* | 3/2024 | Kittichokechai | H04W 72/569 |

OTHER PUBLICATIONS

Huawei et al., "On Simultaneous Rx/Tx UE Capability", 3GPP TSG-RAN WG4 Meeting #97-e, R4-2016469, 3rd Generation Partnership Project, Mobile Competence Centre, 650, Route Des Lucioles, F-06921 Sophia-Antipolis Cedex, France, vol. RAN WG4, No. Electronic Meeting, Nov. 2-Nov. 13, 2020, Oct. 23, 2020, XP051946996, 6 Pages.
International Search Report and Written Opinion—PCT/US2022/016008—ISA/EPO—May 11, 2022.

* cited by examiner

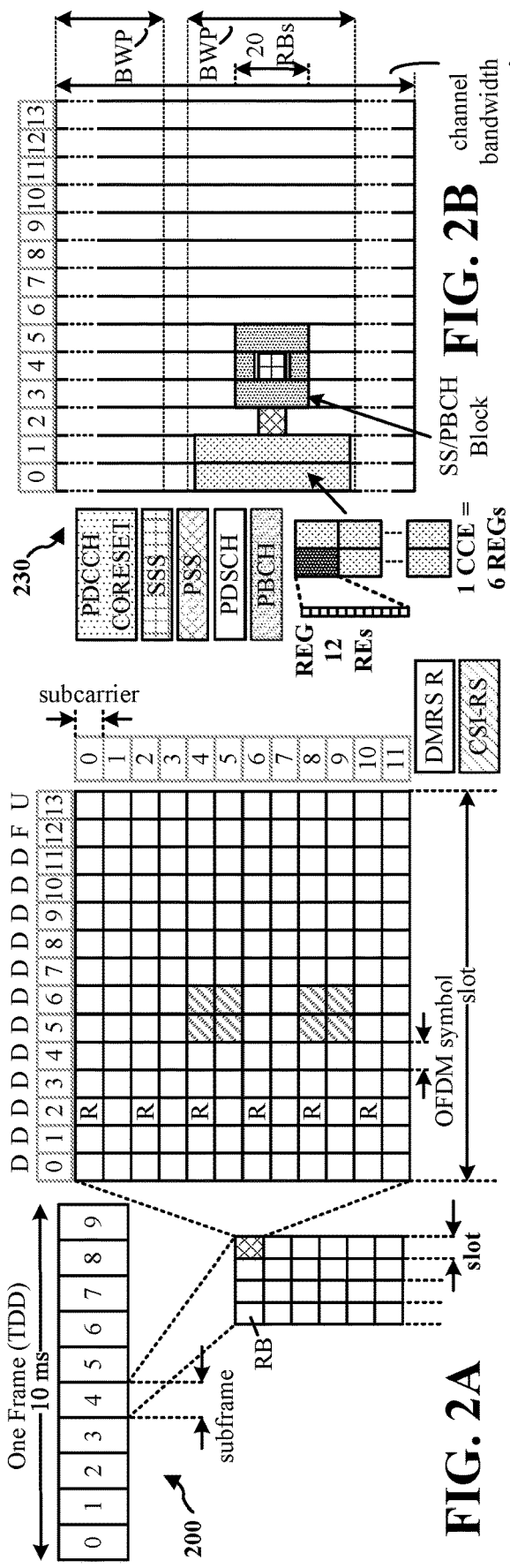
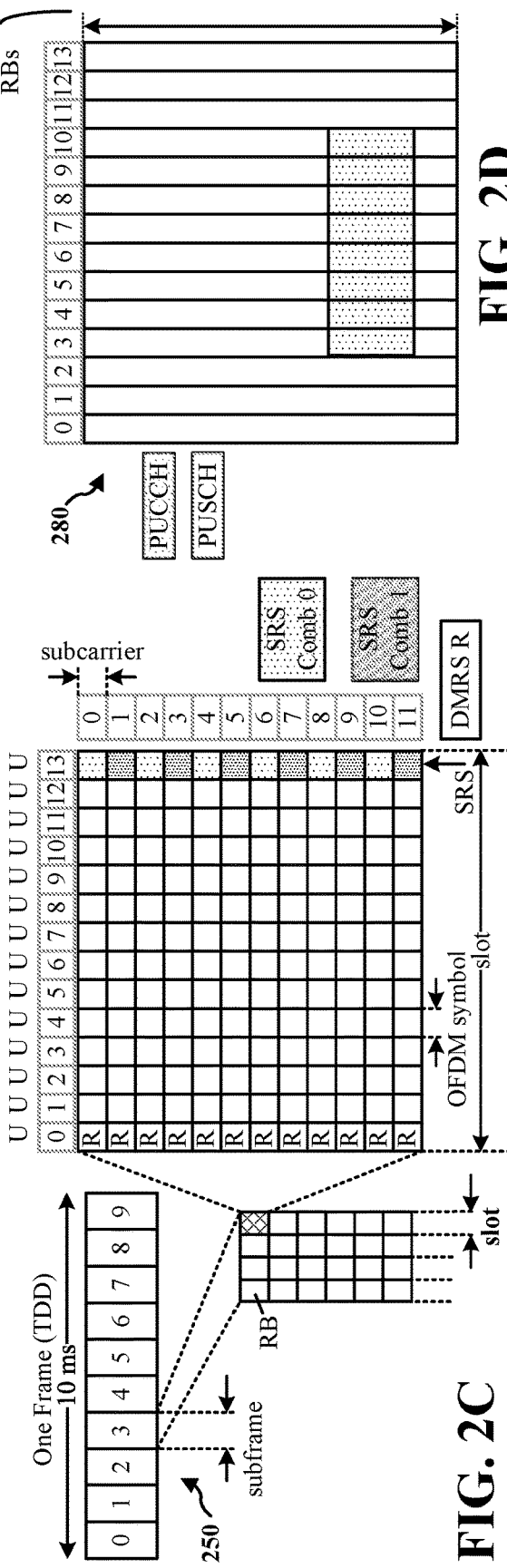
FIG. 2A
FIG. 2B
FIG. 2C
FIG. 2D

SIMULTANEOUS Rx/Tx FOR MULTIPLE CARRIERS

BACKGROUND

Technical Field

The present disclosure relates generally to communication systems, and more particularly, to a wireless communication with multiple carriers.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a user equipment (UE) and a base station. The UE that supports new radio carrier aggregation (NR-CA) with multiple physical uplink control channel (PUCCH) groups or new radio dual connectivity (NR-DC) with multiple cell groups may determine that the UE is not capable of simultaneous reception (Rx) and transmission (Tx) (Rx/Tx) in a first frequency band of a first band group and a second frequency band of a second band group for the NR-CA or the NR-DC. The UE may transmit a first indication that the UE supports the NR-CA with the multiple PUCCH groups or the NR-DC with the multiple cell groups, and a second indication that the UE does not support the simultaneous Rx/Tx in the first frequency band and the second frequency band. In one aspect, the UE may skip reporting to the base station that the UE supports the NR-DC or the NR-CA with the first frequency band in the first band group and the second frequency band in the second band group.

The base station may receive from the UE, the first indication that the UE supports NR-CA with multiple PUCCH groups or NR-DC with multiple cell groups, and the second indication that the UE does not support simultaneous Rx/Tx in the first frequency band and the second frequency band, and schedule communication with the UE to avoid scheduling the simultaneous Rx/Tx based on the NR-CA or the NR-DC in at least the first frequency band of a first band group and the second frequency band of a second band group based on the second indication that the UE is not capable of the simultaneous Rx/Tx in the first frequency band and the second frequency band.

In some aspects, first indication may indicate that the UE supports the NR-DC, and the second indication may indicate that the UE does not support the simultaneous Rx/Tx the first frequency band and the second frequency band with at least one of the first frequency band and the second frequency band being a supplementary uplink (SUL) carrier. In one aspect, the base station may schedule the communication with the UE by avoiding scheduling the UE for simultaneous Rx/Tx the first frequency band as a first carrier type in a first cell group and the second frequency band as a second carrier type in a second cell group, the first carrier type being the SUL carrier and the second carrier type being a non-SUL carrier. In another aspect, the base station may schedule the communication with the UE includes avoiding scheduling the UE for simultaneous Rx/Tx in a first cell group that includes the first frequency band and a second cell group that includes the second frequency band. In another aspect, the base station may schedule the communication with the UE includes avoiding scheduling the UE for simultaneous Rx/Tx in the first frequency band and the second frequency band.

In some aspects, the first indication may indicate that the UE supports the NR-DC with the multiple cell groups, and the UE may receive a configuration, from the base station, for the NR-DC with the first frequency band in a first cell group and the second frequency band in a second cell group. The base station may schedule the communication with the UE by avoiding scheduling the UE for simultaneous Rx/Tx in a first cell group that includes the first frequency band and a second cell group that includes the second frequency band or by avoiding scheduling the UE for simultaneous Rx/Tx in the first frequency band and the second frequency band.

In some aspects, the first indication may indicate that the UE supports the NR-CA with the multiple PUCCH groups, and the UE may receive a configuration, from the base station, for the NR-CA with the first frequency band in a first PUCCH group and the second frequency band in a second PUCCH group. The base station may schedule the communication with the UE includes avoiding scheduling the UE for simultaneous Rx/Tx in a first PUCCH group that includes the first frequency band and a second PUCCH group that includes the second frequency band, or by avoiding scheduling the UE for simultaneous Rx/Tx in the first frequency band and the second frequency band.

In some aspects, the UE may determine that data transmission in the first frequency band of the first band group and data reception in the second frequency band of the second band group overlap in time, and cancel at least a part of the data transmission in the first frequency band of the first band group or the data reception in the second frequency band of the second band group based on the overlap in time.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
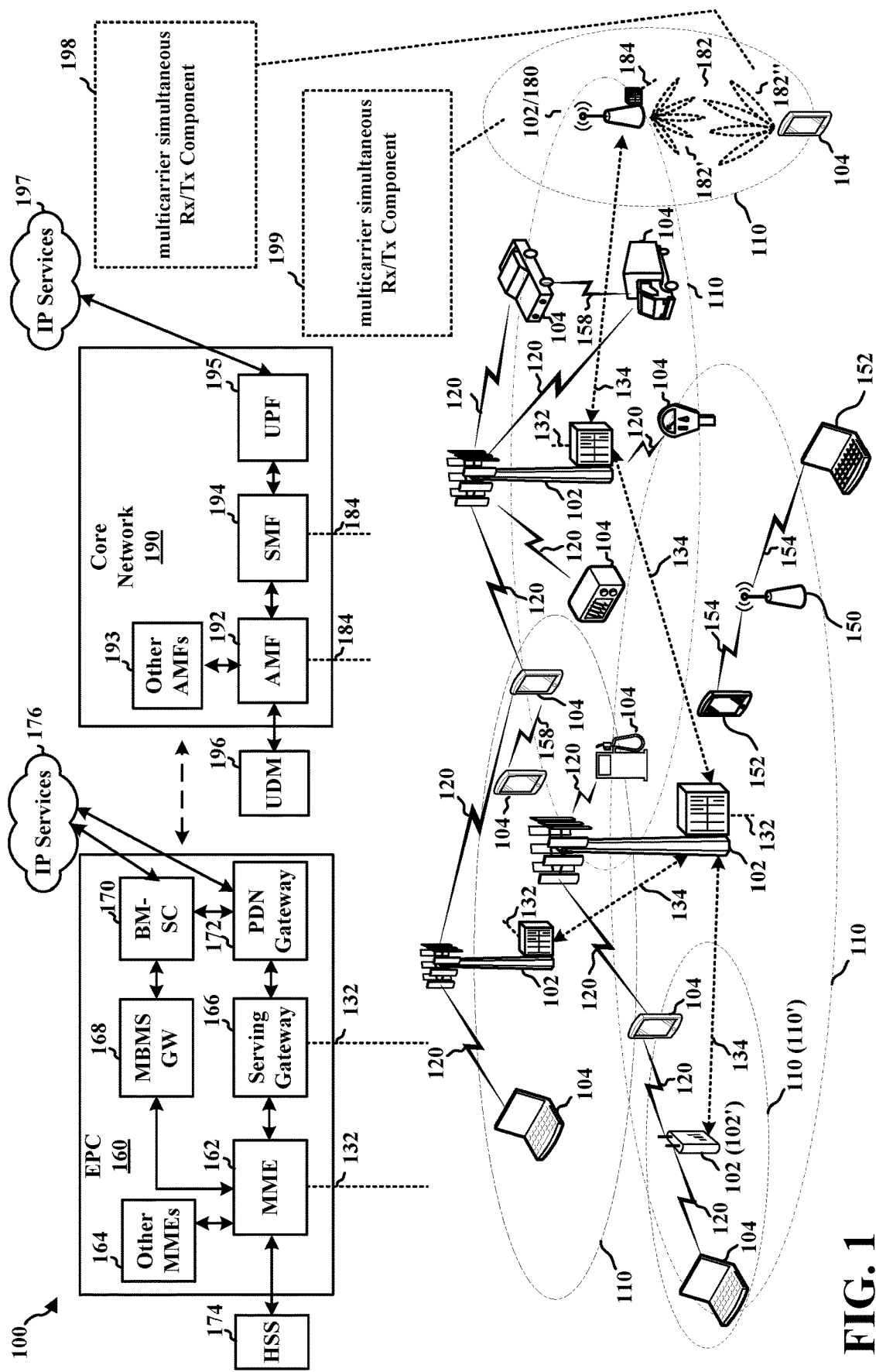
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

A UE may indicate to a base station that the UE supports NR-CA with multiple (e.g., two) PUCCH groups. The indication may signal that the UE supports two PUCCH groups for NR-CA with 3 or more frequency bands with at least two carrier types (e.g., from Frequency Range 1 (FR1) licensed time division duplex (TDD), FR1 unlicensed TDD, FR1 licensed frequency division duplex (FDD), and/or frequency range 2 (FR2)). However, the UE may not support simultaneous transmission and reception for NR-CA in a pair of frequency bands that are in different PUCCH groups. Similarly, a UE may indicate support for NR-DC with multiple cell groups, yet the UE may not support simultaneous transmission and reception for NR-DC in a pair of frequency bands that are in different cell groups.

The present disclosure provides a way in which a base station may determine that a UE is not capable of NR-DC and/or NR-CA communication based on a combination of a pair of bands. For example, the UE may indicate to the base station that the UE is not capable of simultaneous reception and transmission for a pair of a first frequency band and a second frequency band. The base station may interpret the indication, along with the indication of support for NR-CA with two PUCCH groups, to mean that the UE is not capable of NR-CA with simultaneous transmission and reception in the first band in a first PUCCH group and the second frequency band in the second PUCCH. The base station may interpret the indication, along with the indication of support for NR-DC with two cell groups, to mean that the UE is not capable of NR-DC with simultaneous transmission and reception in the first band in a first PUCCH group and the second frequency band in the second PUCCH.

In some aspects, the UE may indicate that simultaneous reception and transmission is not capable for a combination of a supplementary uplink (SUL) carrier and a non-SUL (NSUL) carrier. The base station may interpret the indication, along with the indication of support for NR-DC, to mean that the UE is not capable of NR-DC with a first carrier type (e.g., SUL) in a first cell group and a second carrier type (e.g., NSUL) in a second cell group.

The base station may configure the UE for NR-DC and/or NR-CA, and may make scheduling decisions to avoid scheduling simultaneous transmission and reception in at least the pair of frequency bands based on the determination.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., 51 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a multicarrier simultaneous Rx/Tx component 198 configured to determine that the UE is not capable of simultaneous Rx/Tx in a first frequency band of a first band group and a second frequency band of a second band group for the NR-CA or the NR-DC, and indicate, to a base station, that the UE is not capable of the simultaneous Rx/Tx in the first frequency band and the second frequency band. In certain aspects, the base station 180 may include a multicarrier simultaneous Rx/Tx component 199 configured to receive, from the UE, a first indication that the UE supports NR-CA with multiple PUCCH groups or NR-DC with multiple cell groups, receive, from the UE, a second indication that the UE does not support simultaneous Rx/Tx in a first frequency band and a second frequency band, and schedule communication with the UE to avoid scheduling the simultaneous Rx/Tx based on the NR-CA or the NR-DC in at least the first frequency band of a first band group and the second frequency band of a second band group based on the second indication that the UE is not capable of the simultaneous Rx/Tx in the first frequency band and the second frequency band. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
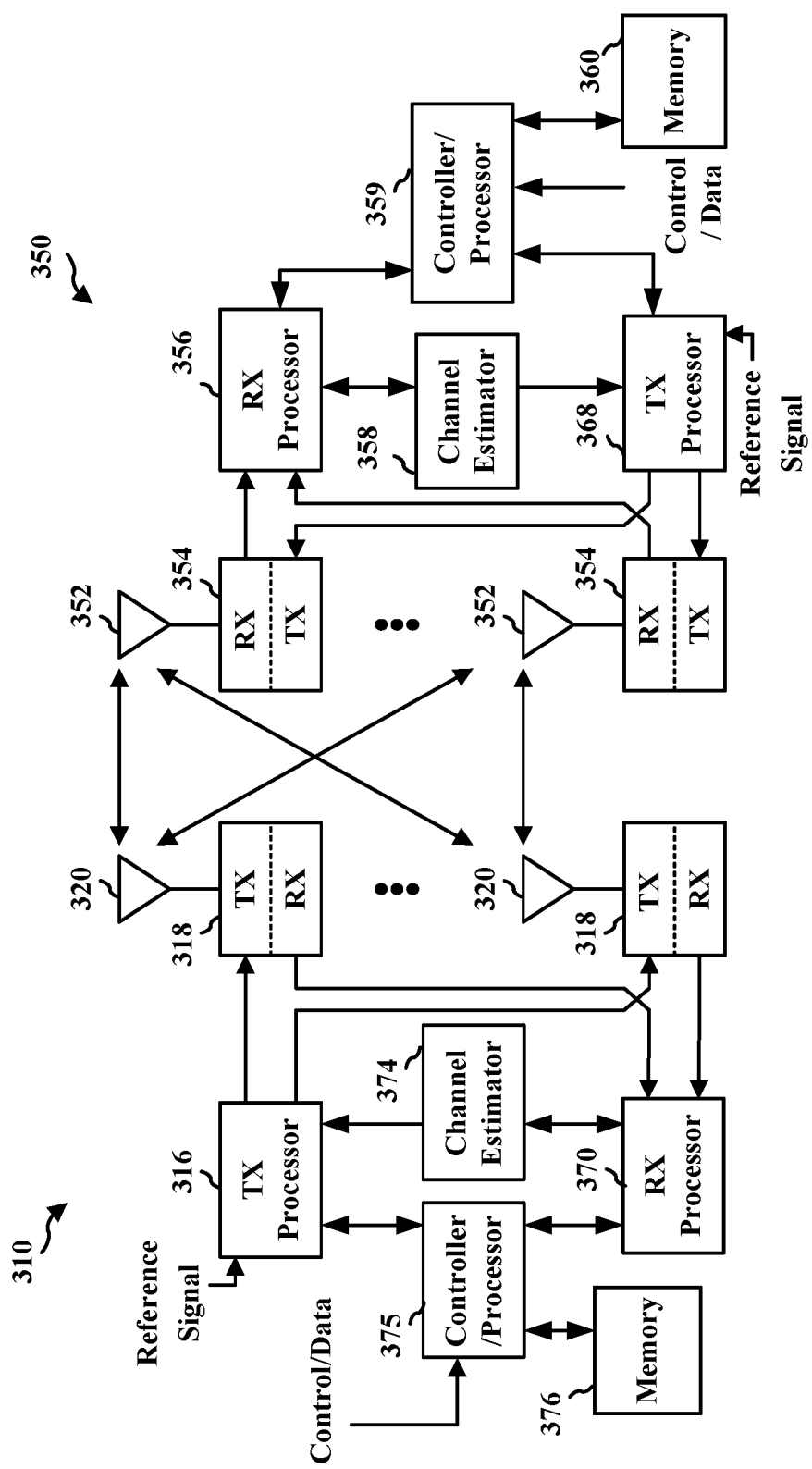
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

A UE and a base station may communicate using multiple carriers. A UE may be configured by a base station for dual connectivity, e.g., connectivity with a primary cell and a secondary cell. NR-DC may indicate that both the primary cell and the secondary cell are NR cells. As another example, the UE may be configured by the base station for NR-CA, e.g., with a primary carrier and a secondary carrier.

The multiple carriers may include at least two carrier types from multiple carrier types. The multiple carrier types may include any combination of FR1 licensed frequency division duplexed (FDD), FR1 licensed time division duplexed (TDD), FR1 unlicensed TDD, and/or FR2.

In some aspects, the wireless communication may support NR-Carrier aggregation (CA) (NR-CA). The UE and the base station may utilize at least two UL and/or DL channels of one or more carrier/band types for wireless communication. The UE and the base station supporting the NR-CA may include at least one PUCCH of a primary PUCCH group with a first carrier type among at least one of the FR1 licensed FDD, the FR1 licensed TDD, the FR1 unlicensed TDD, or the FR2, and at least one PUCCH of a secondary PUCCH group with a second carrier type among at least one of the FR1 licensed FDD, the FR1 licensed TDD, the FR1 unlicensed TDD, or the FR2. For each of the primary PUCCH group and the secondary PUCCH group, each carrier type of the FR1 licensed FDD, the FR1 licensed TDD, the FR1 unlicensed TDD, or the FR2 may be mapped to either or both of the primary PUCCH group and/or the secondary PUCCH group.

In some aspects, the UE may report, to the base station, support for one or more configurations including a supported combination of a primary PUCCH group configuration of the primary PUCCH group and a secondary PUCCH group configuration for each band combination (BC). The UE may indicate the support, e.g., in UE capability signalling to the base station. The primary PUCCH group configuration may indicate at least one carrier type of the the FR1 licensed FDD, the FR1 licensed TDD, the FR1 unlicensed TDD, or the FR2 mapped to the primary PUCCH group, or at least one carrier type of the FR1 licensed FDD, the FR1 licensed TDD, the FR1 unlicensed TDD, or the FR2 that can be configured with the PUCCH transmission in the primary PUCCH group. The secondary PUCCH group configuration may indicate at least one carrier type of the the FR1 licensed FDD, the FR1 licensed TDD, the FR1 unlicensed TDD, or the FR2 mapped to the secondary PUCCH group, or at least one carrier type of the FR1 licensed FDD, the FR1 licensed TDD, the FR1 unlicensed TDD, or the FR2 that can be configured with the PUCCH transmission in the secondary PUCCH group.

Figure 6:
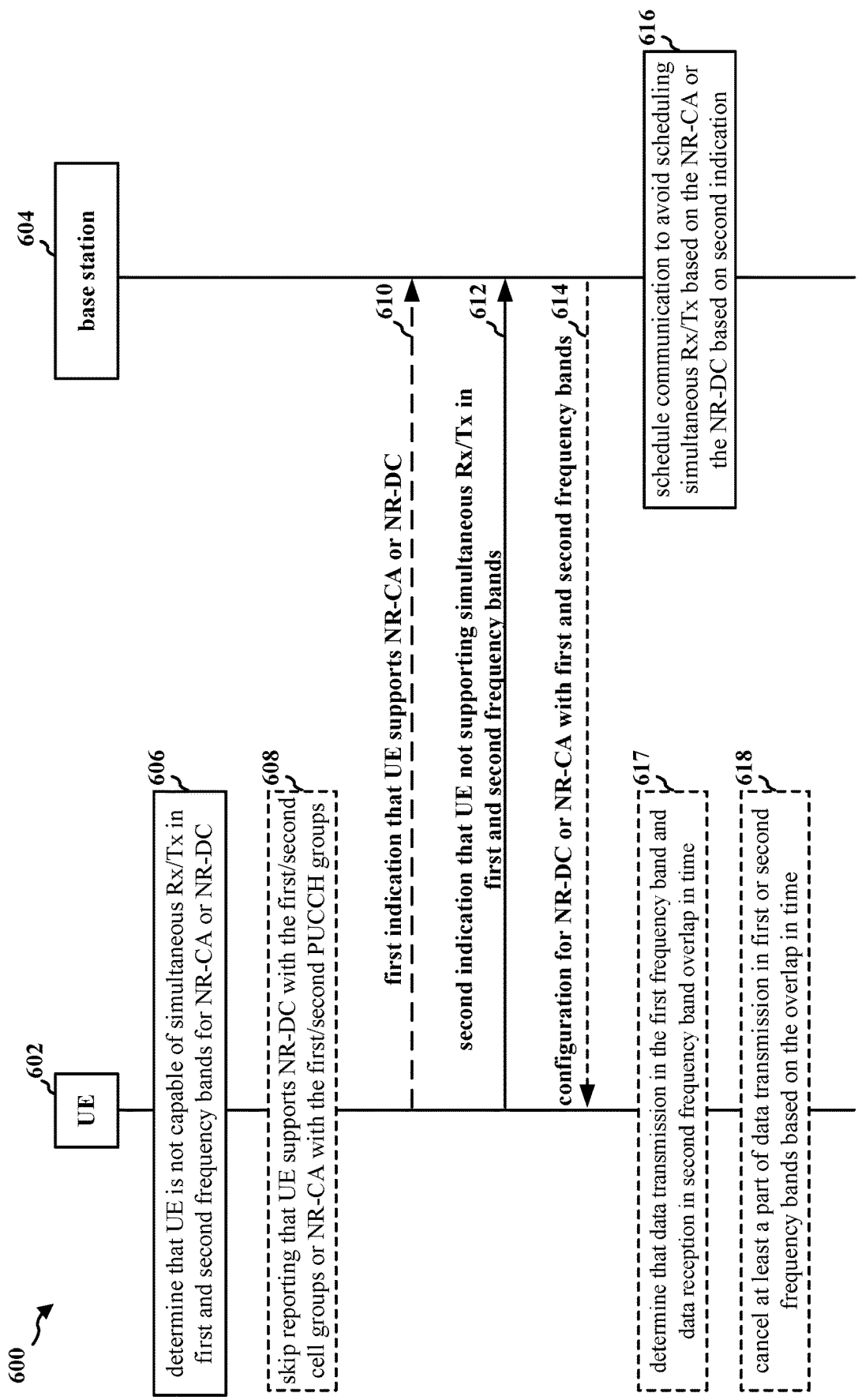
FIG. 6 is a communication diagram of a method of wireless communication.

In some aspects, the UE may indicate support for two PUCCH groups for NR-CA with 3 or more frequency bands with at least two carrier types from the indicated carrier types, e.g., from the group of FR1 licensed TDD, FR1 unlicensed TDD, FR1 licensed FDD, and FR2. FIG. 6, which is described in more detail below, illustrates an example of a UE 602 transmitting an indication to a base station 604 informing the base station that the UE 602 supports NR-CA. As an example, the UE may transmit the indication in UE capability signaling in an RRC message.

In some aspects, the UE may support NR dual connectivity (DC) (NR-DC) and may be configured by the base station for communication based on a primary cell and a secondary cell. The base station may configure the UE for at least two cell-groups of one or more carrier/band types. For example, the UE may support the NR-DC for at least one a master cell-group (MCG) with a first carrier type among at least one of the FR1 licensed FDD, the FR1 licensed TDD, the FR1 unlicensed TDD, or the FR2, and at least one PUCCH of a secondary cell-group (SCG) with a second carrier type among at least one of the FR1 licensed FDD, the FR1 licensed TDD, the FR1 unlicensed TDD, or the FR2. For each of the MCG and the SCG, each carrier type of the FR1 licensed FDD, the FR1 licensed TDD, the FR1 unlicensed TDD, or the FR2 may be mapped to either or both of the MCG and/or the SCG.

In some aspects, the UE may indicate support for two cell groups for NR-DC with 3 or more frequency bands with at least two carrier types from the indicated carrier types, e.g., from the group of FR1 licensed TDD, FR1 unlicensed TDD, FR1 licensed FDD, and FR2. FIG. 6, which is described in more detail below, illustrates an example of a UE 602 transmitting an indication to a base station 604 informing the base station that the UE 602 supports NR-DC. As an example, the UE may transmit the indication in UE capability signaling in an RRC message.

In some aspects, the UE may report, to the base station, one or more configurations including an MCG configuration of the MCG or an SCG configuration of the SCG supported by the UE. The MCG configuration may indicate at least one carrier type of the the FR1 licensed FDD, the FR1 licensed TDD, the FR1 unlicensed TDD, or the FR2 mapped to the primary cell-group, or at least one carrier type of the FR1 licensed FDD, the FR1 licensed TDD, the FR1 unlicensed TDD, or the FR2 that can be configured with the PUCCH transmission in the MCG. The SCG configuration may indicate at least one carrier type of the the FR1 licensed FDD, the FR1 licensed TDD, the FR1 unlicensed TDD, or the FR2 mapped to the secondary cell-group, or at least one carrier type of the FR1 licensed FDD, the FR1 licensed TDD, the FR1 unlicensed TDD, or the FR2 that can be configured with the PUCCH transmission in the SCG.

In other aspects the UE capability for NR-CA and NR-DC may be different. The aspects presented herein may be applied for other capabilities relating to NR-CA and/or NR-DC. For example, for NR-CA or NR-DC for a given band combination, the capability signaling may include which band(s) in the band combination can belong to which group. As an example, a band combination includes {band x, band y, band z}. The UE may report x and y can belong to an MCG and z can belong to an SCG for NR-DC. Similarly, the UE may report that x and y can belong to a primary PUCCH group and z can belong to a secondary PUCCH group for NR-CA.

In some aspects, the wireless communication supporting NR-DC of NR-CA may be configured with a supplementary uplink (SUL) carrier or a supplementary downlink (SDL) carrier associated with a non-supplementary uplink (NUL) carrier or a non-supplementary downlink (NDL) carrier. The SUL or the SDL carrier may be typically located in lower frequency bands to provide enhanced UL or DL coverage. The SDL overlapping with either TDD or FDD may be configured to follow the same principle with TDD or FDD, respectively. The SDL having no overlapped TDD or FDD may follow the same principle with FDD. The carrier type of the NUL may be indicated for a PUCCH transmission location, and the SUL in the same cell as the NUL may also be configured for the PUCCH transmission. Accordingly, the carrier type of NUL may be indicated for one PUCCH group configuration, and the SUL in the same cell as the NUL can also be configured for the PUCCH group.

Figure 4:
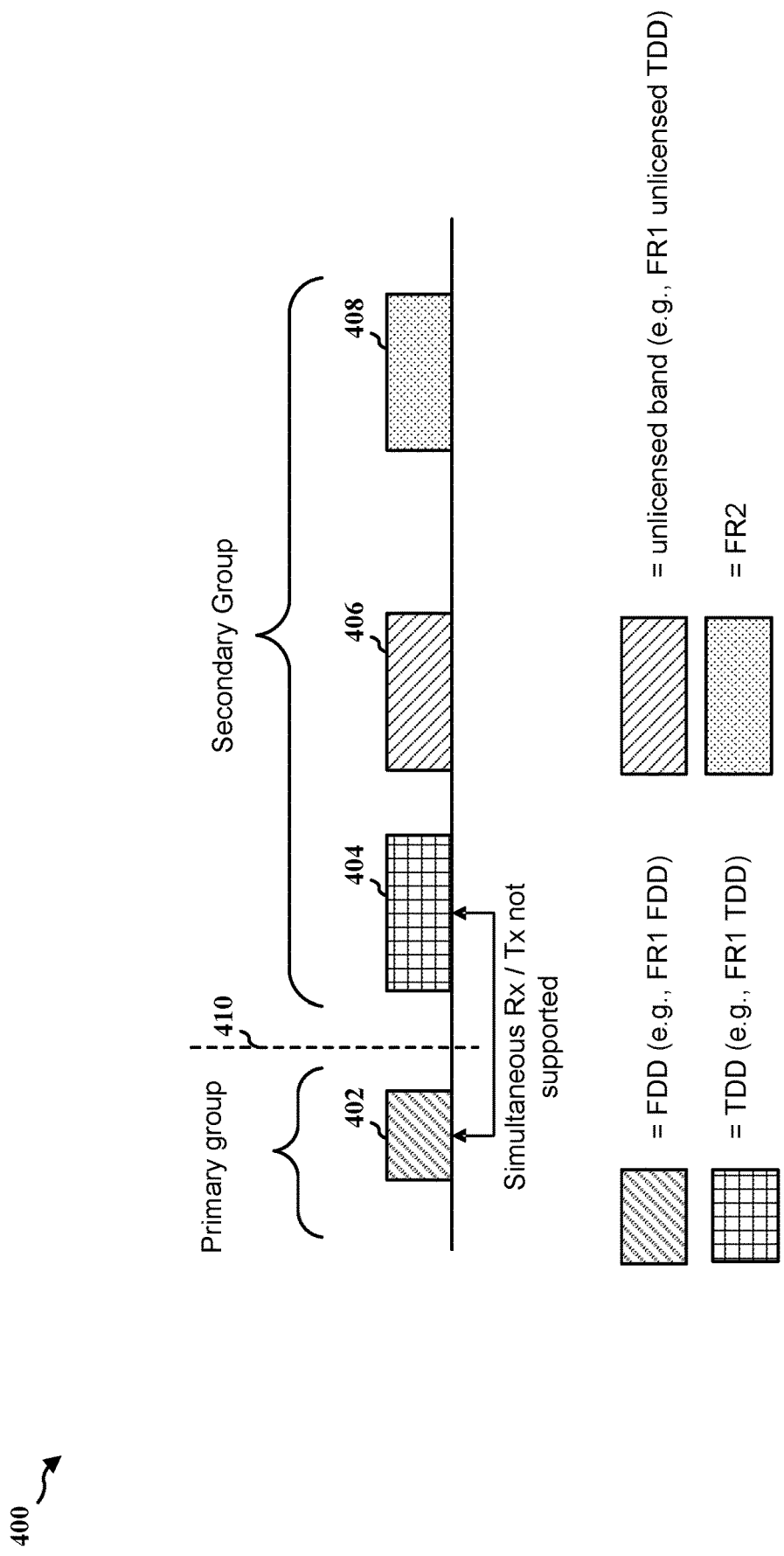
FIG. 4 illustrates band groups 500 a method of wireless communication.

FIG. 4 illustrates band groups 400 of different carrier types that may be supported by the UE for NR-CA and/or NR-DC. The band groups 400 may include a FR1 licensed FDD band 402, a FR1 licensed TDD band 404, a FR1 unlicensed TDD band 406, or a FR2 band 408. The line 410 illustrates that bands of the different the carrier types may be grouped into a primary group and a second group for the UE. For example, the primary group may correspond to a primary PUCCH group for NR-CA, and the secondary group may correspond to a secondary PUCCH group for NR-CA. Similarly, the primary group may correspond to a primary cell group, e.g., an MCG, for NR-DC, and the secondary group may correspond to a secondary cell group, e.g., SCG, for NR-DC.

In some aspects, the wireless communication system including the UE and the base station may support the NR-DC, and the UE may indicate that is does not support (e.g., is not capable of) simultaneous Rx/Tx for a pair of frequency bands. As used herein, "simultaneous" means that the reception and transmission in the pair of frequency bands overlaps, at least partially, in time. FIG. 6 illustrates an example of the UE 602 transmitting an indication 612 informing the base station 604 that the UE does not support simultaneous transmission and reception in a pair of frequency bands. As an example, the UE may transmit the indication 612 in UE capability signaling in an RRC message. The indication may indicate that the UE does not support a capability parameter, which may be referred to as "simultaneousRxTxInterBandCA."

As the UE and the base station may utilize at least two cells of one or more carrier/band types for simultaneous Rx/Tx of data in NR-DC, aspects presented herein enable the base station to interpret the UE's indication of a lack of support for simultaneous Rx/Tx in the pair of frequency bands if one frequency band is in one cell group for NR-DC and another frequency band is in the other cell group for NR-DC. The UE and the base station supporting the NR-DC may include at least one band of a first cell-group with a first carrier type among at least one of the FR1 licensed FDD band 402, the FR1 licensed TDD band 404, the FR1 unlicensed TDD band 406, or the FR2 band 408, and at least one band of a second cell-group with a second carrier type among at least one of the FR1 licensed FDD band 402, the FR1 licensed TDD band 404, the FR1 unlicensed TDD band 406, or the FR2 band 408. For each of the first cell-group and the second cell-group, each carrier type of the FR1 licensed FDD band 402, the FR1 licensed TDD band 404, the FR1 unlicensed TDD band 406, or the FR2 band 408 may be mapped to either or both of the first cell-group and/or the second cell-group.

In some aspects, as illustrated in the example in FIG. 4, the first cell-group may include a first band in the FR1 licensed FDD band 402, and the second cell-group may include a second band in one of the FR1 licensed TDD band 404, the FR1 unlicensed TDD band 406, or the FR2 band 408. The UE may not support simultaneous data Rx/Tx via a first band of the first cell-group including the FR1 licensed FDD band 402 and a second band of the second cell-group including one of the FR1 licensed TDD band 404, the FR1 unlicensed TDD band 406, or the FR2 band 408. For example, the UE may not support simultaneous Rx/Tx with the FR1 FDD band 402 in the MCG and the FR1 TDD band in the SCG.

The UE may transmit, for each of multiple BCs, an indication to the base station about whether the UE supports simultaneous Rx/Tx of data in a particular band pair. via the first band of the first cell-group in the FR1 licensed FDD band 402 and the second band of the second cell-group in one of the FR1 licensed TDD band 404, the FR1 unlicensed TDD band 406, or the FR2 band 408. In one aspect, the UE may transmit, to the base station, a radio resource control (RRC) message including a set of UE radio access capability parameters indicating whether the UE supports simultaneous Tx/Rx in TDD-TDD and TDD-FDD inter-band NR-DC. For example, the UE may send, to the base station, a UE radio access capability parameter, e.g., simultaneousRxTx-InterBandENDC, indicating the UE may support simultaneous Tx/Rx in TDD-TDD and TDD-FDD inter-band NR-DC.

The base station may receive the indication from the UE that the UE does not support simultaneous Rx/Tx of data via the first band of the first cell-group in the FR1 licensed FDD band 402 and the second band of the second cell-group in one of the FR1 licensed TDD band 404, the FR1 unlicensed TDD band 406, or the FR2 band 408. In one aspect, the network may determine, based on the indication received from the UE, that the UE is not capable of NR-DC with the first band in the first cell-group and the second band in the second cell-group. Accordingly, the network may schedule the communication with the UE to avoid scheduling the Rx/Tx of data simultaneously in the first frequency band of the first cell group and the second frequency band of the second cell group.

In some aspects, the network including the base station may receive the indication from the UE that the UE does not support simultaneous Rx/Tx in the first band of the first band group and the second band of the second band group, and interpret the indication to mean the UE is not capable of supporting NR-DC with the first band in the first cell-group and the second band in the second cell-group. That is, the network may interpret that the UE does not support the NR-DC with the first band in the first cell-group and the second band in the second cell-group based on the indication received from the UE indicating the UE's lack of support for simultaneous Rx/Tx in the first band of the first cell group in the FR1 licensed FDD band 402 and the second band of the second cell group in one of the FR1 licensed TDD band 404, the FR1 unlicensed TDD band 406, or the FR2 band 408. Accordingly, the network may not configure NR-DC for the UE with the first band in the first cell-group and the second band in the second cell-group. Alternately, the base station may configure NR-DC for the UE, but may avoid scheduling simultaneous Rx/Tx for NR-DC with the first band in the first cell-group and the second band in the second cell-group.

In some aspects, the UE may determine not to report, or to underreport, that the UE is capable of NR-DC with a first band in a first cell-group and a second band in a second cell-group if the UE determines that the UE is not capable of simultaneous Rx/Tx for the pair of the first band and the second band. For example, underreporting may mean that the UE indicates or implies that NR-DC is not supported due to the incapability of simultaneous Rx/Tx.

In some aspects, the base station may receive the indication from the UE that the UE does not support simultaneous Rx/Tx in the first band of the first cell group and the second band of the second cell group, and may interpret that the UE is not capable of simultaneous Rx/Tx for NR-DC for any pairs of bands including one band in the first cell-group and another band in the second cell-group. That is, the network may determine that the UE may not be scheduled for simultaneous Rx/Tx for NR-DC for any pairs of bands including one band in the first cell-group and another band in the second cell-group, and may schedule the UE accordingly to avoid simultaneous Rx/Tx for any frequency band of the first cell group that overlaps in time with any frequency band of the second cell group. Thus, the base station may avoid scheduling conflicting data Rx/Tx simultaneously for any pairs of bands including one band in the first cell-group and another band in the second cell-group.

In some aspects, the UE may be configured with the NR-DC with the first band in the first cell-group and the second band in the second cell-group following the UE's indication that the UE is not capable of simultaneous Rx-Tx for the pair of the first band in the first band group and the second band in the second band group.

In one aspect, the network scheduler may be configured to avoid simultaneously scheduling a Rx and/or Tx in the first band of the first band group and a Tx and/or Rx in the second band that the UE indicated that the UE may not support simultaneous Rx/Tx in the first band of the first band group and the second band of the second band group. Accordingly, the UE may not expect any simultaneous Rx/Tx of data for the pair of bands indicated by the UE that the UE may not support simultaneous Rx/Tx in the first band of the first band group and the second band of the second band group.

In another aspect, the UE may support a collision handling capability, and the UE may drop either transmission or reception of the data transmission of colliding Rx/Tx in the first band and Tx/Rx in the second band simultaneously according to specific rules. That is, the UE may determine to cancel transmitting, or cancel receiving, at least a part of the data in the first frequency band of the first cell group and/or data in the second frequency band of the second cell group in response to the overlap in time. The cancellation behavior may be a UE decision in some aspects. In other aspects, the cancellation behavior may be based on a defined rule. As an example, if a DL reception and a UL transmission collides, the UE may drop the UL transmission (i.e., does not transmit the UL) based on the UE's determination or based on a defined rule. As another example, if a first DL reception or a first UL transmission starts earlier than a second DL reception or a second UL transmission overlaps in time with the first one, then the UE may drop (e.g., not transmit or receive) the second one that starts later based on the UE's determination or based on a defined rule. The determination to drop/cancel a transmission or reception can be based on various other possible factors, such as serving cell index, duplex-mode, etc.

In some aspects, the UE may support the NR-CA. The UE and the base station may utilize at least two UL and/or DL channels of one or more carrier/band types for simultaneous Rx/Tx of the data. The NR-CA may include at least one band of a first PUCCH group with a first carrier type among at least one of the FR1 licensed FDD band 402, the FR1 licensed TDD band 404, the FR1 unlicensed TDD band 406, or the FR2 band 408, and at least one band of a second PUCCH group with a second carrier type among at least one of the FR1 licensed FDD band 402, the FR1 licensed TDD band 404, the FR1 unlicensed TDD band 406, or the FR2 band 408. For each of the first PUCCH group and the second PUCCH group, each carrier type of the FR1 licensed FDD band 402, the FR1 licensed TDD band 404, the FR1 unlicensed TDD band 406, or the FR2 band 408 may be mapped to either or both of the first PUCCH group and/or the second PUCCH group.

In some aspects, the first PUCCH group may include a first band in the FR1 licensed FDD band 402, and the second PUCCH group may include a second band in one of the FR1 licensed TDD band 404, the FR1 unlicensed TDD band 406, or the FR2 band 408. The UE may not support simultaneous data Rx/Tx via a first band of the first PUCCH group including the FR1 licensed FDD band 402 and a second band of the second PUCCH group including one of the FR1 licensed TDD band 404, the FR1 unlicensed TDD band 406, or the FR2 band 408.

The UE may transmit, for each BC, an indication to the base station that the UE does not support simultaneous Rx/Tx in a pair of frequency bands. For example, the UE might not support simultaneous Rx/Tx in a first band of the first PUCCH group in the FR1 licensed FDD band 402 and the second band of the second PUCCH group in one of the FR1 licensed TDD band 404, the FR1 unlicensed TDD band 406, or the FR2 band 408. In one aspect, the UE may transmit, to the base station, an RRC message including a set of UE radio access capability parameters indicating whether the UE supports simultaneous transmission and reception in TDD-TDD and TDD-FDD inter-band NR-CA. For example, the UE may send, to the base station, a UE radio access capability parameter, e.g., simultaneousRxTxInterBandCA, indicating whether the UE supports simultaneous transmission and reception in TDD-TDD and TDD-FDD inter-band NR-CA.

The base station may receive the indication 612 from the UE that the UE does not support simultaneous Rx/Tx of data via the first band of the first PUCCH group in the FR1 licensed FDD band 402 and the second band of the second PUCCH group in one of the FR1 licensed TDD band 404, the FR1 unlicensed TDD band 406, or the FR2 band 408. In one aspect, the network may determine, based on the indication received from the UE, that the UE is not capable of NR-CA with the first band in the first PUCCH group and the second band in the second PUCCH group. Accordingly, the network may schedule the communication with the UE to avoid scheduling the Rx/Tx of data simultaneously in the first band in the first PUCCH group and the second band in the second PUCCH group.

In some aspects, in response to the UE transmitting an indication to the base station that the UE does not support simultaneous Rx/Tx in the first band of the first PUCCH group and the second band of the second PUCCH group, the base station and the UE may have various ways to configure the NR-CA, schedule communication, handle capability signaling, and/or handle collisions.

In some aspects, the base station may receive the indication 612 from the UE that the UE does not support simultaneous Rx/Tx in the first band and the second band, and interpret that the UE is not capable of NR-CA with the first band in the first PUCCH group and the second band in the second PUCCH group. That is, the network may interpret that the UE may not support the NR-CA with the first band in the first PUCCH group and the second band in the second PUCCH group based on the indication received from the UE indicating the UE's lack of support for simultaneous Rx/Tx in the first band in the FR1 licensed FDD band 402 and the second band in one of the FR1 licensed TDD band 404, the FR1 unlicensed TDD band 406, or the FR2 band 408. Accordingly, the network may not configure NR-CA for the UE with the first band in the first PUCCH group and the second band in the second PUCCH group. Alternately, the base station may configure the UE for NR-CA, but may avoid scheduling the UE for simultaneous Rx/Tx involving the first band in the first PUCCH group and the second band in the second PUCCH group.

In some aspects, the UE may determine not to report that the US is capable of NR-CA with a first band in a first PUCCH group and a second band in a second PUCCH group if the UE is not capable of simultaneous Rx/Tx for the pair of the first band and the second band. That is, in response to transmitting the indication that the UE may not support simultaneous Rx/Tx in the first band of the first band group and the second band of the second band group, the UE may determine not to report, to the base station, that the UE is capable of NR-CA with the first band in the first PUCCH group and the second band in the second PUCCH group.

In some aspects, the base station may receive the indication from the UE that the UE does not support simultaneous Rx/Tx in the first band (that is in the first PUCCH group) and the second band (that is in the second PUCCH group), and interpret that the UE is not capable of simultaneous Rx/Tx for NR-CA for any pairs of bands including one band in the first PUCCH group and another band in the second PUCCH group. That is, the base station may determine that the UE may not be scheduled for simultaneous Rx/Tx for NR-CA for any pairs of bands including one band in the first PUCCH group and another band in the second PUCCH group. The schedulers of the network may avoid scheduling conflicting data Rx/Tx simultaneously for any pairs of bands including one band in the first PUCCH group and another band in the second PUCCH group.

In some aspects, the UE may be configured with the NR-CA with the first band in the first PUCCH group and the second band in the second PUCCH group following the UE's indication that the UE is not capable of simultaneous Rx-Tx for the pair of the first band (that is in the first PUCCH group) and the second band (that is in the second PUCCH group).

In one aspect, the network scheduler may be configured to avoid simultaneously scheduling a Rx and/or Tx in the first band of the first band group and a Tx and/or Rx in the second band in response to the UE's indication 612 that the UE does not support simultaneous Rx/Tx in the first band (that is in the first band group) and the second band (that is in the second band group). Accordingly, the UE may not expect any simultaneous Rx/Tx of data for the pair of bands indicated by the UE that the UE does not support simultaneous Rx/Tx in the first band of the first PUCCH group and the second band of the second PUCCH group.

In another aspect, the UE may support a collision handling capability, and the UE may drop either transmission or reception of the data transmission of colliding Rx/Tx in the first band and Tx/Rx in the second band simultaneously according to specific rules. That is, the UE may determine to cancel transmitting at least a part of the data Tx/Rx in the first frequency band of the first PUCCH group and data Rx/Tx in the second frequency band of the second PUCCH group that overlap in time.

Figure 5:
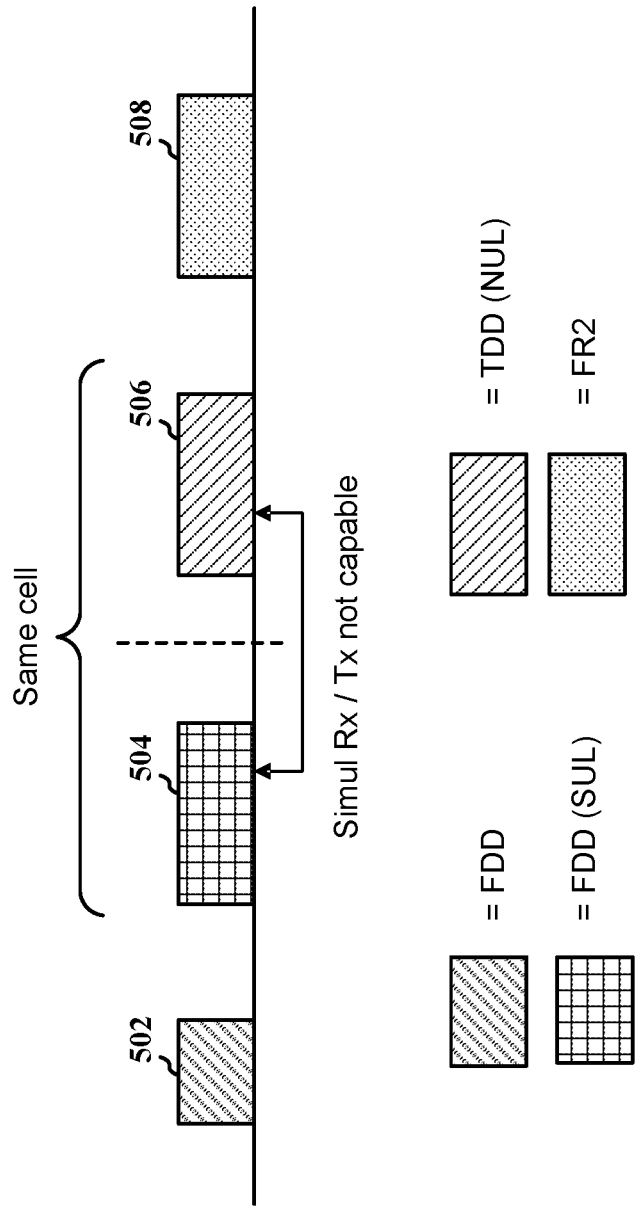
FIG. 5 illustrates band groups 500 a method of wireless communication.

FIG. 5 illustrates band groups 500 of a method of wireless communication. The band groups 500 may include a FR1 licensed FDD band 502, a FR1 licensed TDD band 504, a FR1 unlicensed TDD band 506, or a FR2 506 band.

In some aspects, the wireless communication supporting NR-DC or NR-CA may be configured with a SUL carrier associated with a NUL carrier. The UE may not support simultaneous data Rx/Tx via a first band having a NUL type in the FR1 licensed TDD band 504 and a second band having a SUL type in the FR1 licensed FDD band 502 of the same cell as the first band having the NUL type. The UE may transmit, for each BC, an indication to the base station that the UE does not support simultaneous Rx/Tx of data via the first band of the first cell-group in the FR1 licensed FDD band 502 and the second band of the second cell-group in one of the FR1 licensed TDD band 504, the FR1 unlicensed TDD band 506, or the FR2 band 508. In one aspect, the UE may transmit, to the base station, a radio resource control (RRC) message including a set of UE radio access capability parameters indicating whether the UE supports simultaneous Tx/Rx in TDD-TDD and TDD-FDD inter-band NR-DC. For example, the UE may send, to the base station, a UE radio access capability parameter, such as a simultaneousRxTxSUL parameter indicating whether the UE supports simultaneous Rx/Tx for a NR band combination including SUL, and a simultaneousTxSUL-NonSUL parameter indicating whether the UE supports simultaneous transmission of SRS on a SUL/non-SUL carrier and PUSCH/PUCCH/SRS on the other UL carrier in the same cell. For example, the UE may support simultaneous transmission on a SUL band X and a Non-SUL band Y, and the capability parameter for both band X and band Y may be configured based on the simultaneousTxSUL-NonSUL parameter.

However, if the carrier type of the NUL is indicated for a PUCCH transmission location, then the SUL in the same cell as the NUL may also be configured for the PUCCH transmission, and therefore, if the carrier type of NUL is indicated for one PUCCH group configuration, then the base station may determine that the SUL in the same cell as the NUL can also be configured for the PUCCH group. For example, If the UE indicates that the UE may support NR-DC or NR-CA with FDD on one cell-group and TDD+FR2 on the other cell-group, the network including the base station may consider that the UE is able to handle simultaneous Rx-Tx between the two cell-groups, and the network may erroneously determine that the UE may support the combination of the SUL in the FR1 licensed FDD band and the NUL in the FR1 licensed TDD band to configure the NR-DC.

The network including the base station may receive the indication, e.g., 612, from the UE that the UE does not support simultaneous Rx/Tx of data via the NUL of the first cell-group in the FR1 licensed FDD band 502 and the SUL of the second cell-group in one of the FR1 licensed TDD band 504, the FR1 unlicensed TDD band 506, or the FR2 band 508. In one aspect, the network may determine, based on the indication 612 received from the UE, that the UE is not capable of NR-DC or NR-CA with the NUL in the first cell-group and the SUL in the second cell-group. Accordingly, the network may schedule the communication with the UE to avoid scheduling the Rx/Tx of data simultaneously in the NUL of the first cell group and the SUL of the second cell group.

In some aspects, in response to the UE transmitting an indication to the base station that the UE does not support simultaneous Rx/Tx in the NUL carrier and the SUL carrier, the base station and the UE may have various ways to configure the NR-DC or NR-CA of the NUL carrier and/or the SUL carrier, to schedule the UE, to indicate UE capability, and/or to handle collisions.

In some aspects, the base station may receive the indication from the UE that the UE does not support simultaneous Rx/Tx in the NUL carrier and the SUL carrier, and interpret that the UE is not capable of NR-DC with the NUL in the first cell-group and the SUL in the second cell-group. That is, the network may interpret that the UE may not support the NR-DC with the NUL in the first cell-group and the SUL in the second cell-group based on the indication received from the UE indicating the UE's incapability of simultaneous Rx/Tx in the NUL carrier in the FR1 licensed FDD band 502 and the SUL carrier in one of the FR1 licensed TDD band 504, the FR1 unlicensed TDD band 506, or the FR2 band 508. Accordingly, the network may not schedule or configure NR-DC for the UE with the NUL in the first cell-group and the SUL in the second cell-group. Alternately, the base station may configure NR-DC for the UE with the NUL in the first cell-group and the SUL in the second cell-group, and may avoid scheduling simultaneous Rx/Tx for the NUL and the SUL.

In some aspects, the UE may determine not to report that the UE is capable of NR-DC with an NUL in a first cell-group and a SUL in a second cell-group if the UE indicates that the UE is not capable of simultaneous Rx/Tx for the pair of NUL-SUL. That is, in response to determining a lack of support for simultaneous Rx/Tx in the NUL carrier and the SUL carrier, the UE may determine not to report, to the base station, that the UE is capable of NR-DC with the NUL in the first cell-group and the SUL in the second cell-group.

In some aspects, the base station may receive the indication from the UE that the UE does not support simultaneous Rx/Tx in the NUL carrier and the SUL carrier, and may interpret that the UE is not capable of simultaneous Rx/Tx for NR-DC for any pairs of bands including one band in the first cell-group and another band in the second cell-group. That is, the network may determine that the UE may not be configured for simultaneous Rx/Tx for NR-DC for any pairs of bands including one type of band (e.g., NUL) in the first cell-group and another type of band (e.g., SUL) in the second cell-group. The schedulers of the network may avoid scheduling conflicting data Rx/Tx simultaneously for any pairs of bands including one band in the first cell-group and another band in the second cell-group.

In some aspects, the UE may be configured with the NR-DC with the NUL in the first cell-group and the SUL in the second cell-group following the UE's indication that the UE is not capable of simultaneous Rx-Tx for the pair of the NUL-SUL.

In one aspect, the network scheduler may be configured to avoid simultaneously scheduling a Rx and/or Tx in the NUL carrier and a Tx and/or Rx in the SUL carrier that the UE indicated that the UE does not support simultaneous Rx/Tx in the NUL carrier and the SUL carrier. Accordingly, the UE may not expect any simultaneous Rx/Tx of data for the pair of NUL-SUL indicated by the UE that the UE may not support simultaneous Rx/Tx in the NUL carrier and the SUL carrier.

In another aspect, the UE may support a collision handling capability, and the UE may drop either transmission or reception of the data transmission of colliding Rx/Tx in the NUL and Tx/Rx in the SUL simultaneously according to specific rules. That is, the UE may determine to cancel transmitting at least a part of the data Tx/Rx in the first frequency band of the NUL carrier and data Rx/Tx in the second frequency band of the SUL carrier that overlap in time.

FIG. 6 is a communication diagram 600 of a method of wireless communication. The communication diagram 600 may include a UE 602 and a base station 604. Here, the UE may support NR-CA with multiple PUCCH groups or NR-DC with multiple cell groups yet may not support simultaneous Rx/Tx on a pair of a first frequency band and a second frequency band that are in different cell groups/PUCCH groups.

At 606, the UE may determine that the UE is not capable of simultaneous Rx/Tx in a first frequency band of a first band group and a second frequency band of a second band group for the NR-CA or the NR-DC, such as described in connection with FIG. 4 and/or FIG. 5. In one aspect, the UE may not be capable of supporting simultaneous data Rx/Tx via a first band of the first cell-group including the FR1 licensed FDD band and a second band of a second cell-group including one of a FR1 licensed TDD band, a FR1 unlicensed TDD band, or a FR2 band. In another aspect, the UE may not be capable of supporting simultaneous data Rx/Tx via a first band of the first band group including the FR1 licensed FDD band and a second band of the second band group including one of the FR1 licensed TDD band, the FR1 unlicensed TDD band, or the FR2 band. In another aspect, the UE may not be capable of supporting simultaneous data Rx/Tx via a first band having a NUL type in the FR1 licensed TDD band and a second band having a SUL type in the FR1 licensed FDD band of the same cell as the first band having the NUL type.

At 608, the UE may skip reporting to the base station that the UE supports the NR-DC or the NR-CA with the first frequency band in the first band group and the second frequency band in the second band group. Thus, in response to the determination, at 606, the UE may underreport its capability for NR-DC or NR-CA, if the UE does not support simultaneous Rx/Tx for the pair of frequency bands in different cell groups/PUCCH groups.

At 610, the UE may transmit, to the base station, a first indication that the UE may support the NR-CA with the multiple PUCCH groups or the NR-DC with the multiple cell groups. The base station may receive, from the UE, the first indication that the UE supports NR-CA with multiple PUCCH groups or NR-DC with multiple cell groups. The indication may be provided in UE capability signaling, e.g., in an RRC message.

At 612, the UE may indicate, to the base station, that the UE is not capable of the simultaneous Rx/Tx in the first frequency band and the second frequency band by sending a second indication that the UE may not support the simultaneous Rx/Tx in the first frequency band and the second frequency band. The base station may receive, from the UE, the second indication that the UE does not support simultaneous Rx/Tx in the first frequency band and the second frequency band. The second indication may indicate a UE capability to support a parameter such as the second indication may be comprised in RRC signaling, for example. In some aspects, the indication may indicate a lack of support for a parameter such as simultaneousRxTxInterBandCA and/or simultaneousTxSUL-NonSUL.

In one aspect, the first indication may indicate that the UE may support the NR-DC, and the second indication may indicate that the UE may not support the simultaneous Rx/Tx the first frequency band and the second frequency band with at least one of the first frequency band and the second frequency band being a SUL carrier.

At 614, The base station may transmit a configuration for NR-DC or NR-CA with the first frequency band and the second frequency band to the UE, and the UE may receive the configuration for NR-DC or NR-CA with the first frequency band and the second frequency band from the base station.

In one aspect, the base station may transmit a configuration for the NR-DC with the first frequency band in a first cell group and the second frequency band in a second cell group based on the first indication indicating that the UE may support the NR-DC with the multiple cell groups. The UE may receive the configuration, from the base station, for the NR-DC with the first frequency band in a first cell group and the second frequency band in a second cell group.

In another aspect, the base station may transmit a configuration for the NR-CA with the first frequency band in a first PUCCH group and the second frequency band in a second PUCCH group based on the first indication indicating that the UE may support the NR-CA with the multiple PUCCH groups. The UE may receive the configuration, from the base station, for the NR-CA with the first frequency band in a first PUCCH group and the second frequency band in a second PUCCH group.

In another aspect, the base station may transmit a configuration for the NR-DC with the first frequency band in a first cell group and the second frequency band in a second cell group based on the first indication indicating that the UE may support the NR-DC and the second indication indicating that the UE may not support the simultaneous Rx/Tx the first frequency band and the second frequency band with at least one of the first frequency band and the second frequency band being a SUL carrier. The UE may receive the configuration, from the base station, for the NR-DC with the first frequency band in a first cell group and the second frequency band in a second cell group.

At 616, the base station may schedule communication with the UE to avoid scheduling the simultaneous Rx/Tx based on the NR-CA or the NR-DC in at least the first frequency band of the first band group and the second frequency band of the second band group based on the second indication that the UE is not capable of the simultaneous Rx/Tx in the first frequency band and the second frequency band.

In some aspects, the first indication indicates that the UE supports the NR-DC. In one aspect, the base station may schedule the communication with the UE by avoiding scheduling the UE for simultaneous Rx/Tx the first frequency band in the first cell group and the second frequency band in the second cell group. In another aspect, the base station may schedule the communication with the UE by avoiding scheduling the UE for simultaneous Rx/Tx in a first cell group that includes the first frequency band and a second cell group that includes the second frequency band.

In some aspects, the first indication indicates that the UE supports the NR-CA. In one aspect, the base station may schedule the communication with the UE by avoiding scheduling the UE for simultaneous Rx/Tx the first frequency band in the first PUCCH group and the second frequency band in the second PUCCH group. In another aspect, the base station may schedule the communication with the UE by avoiding scheduling the UE for simultaneous Rx/Tx in a first PUCCH group that includes the first frequency band and a second PUCCH group that includes the second frequency band.

In some aspects, where the first indication indicates that the UE supports the NR-DC and the second indication indicates that the UE does not support the simultaneous Rx/Tx the first frequency band and the second frequency band with at least one of the first frequency band and the second frequency band being a SUL carrier. The base station may schedule the communication with the UE by avoiding scheduling the UE for simultaneous Rx/Tx the first frequency band as a first carrier type in a first cell group and the second frequency band as a second carrier type in a second cell group, the first carrier type being the SUL carrier and the second carrier type being a non-SUL carrier.

At 617, the UE may determine that data transmission in the first frequency band of the first band group and data reception in the second frequency band of the second band group overlap in time.

At 618, the UE may cancel at least a part of the data transmission in the first frequency band of the first band group or the data reception in the second frequency band of the second band group based on the overlap in time. For example, the UE may cancel at least a part of the data transmission by dropping at least a part of the data transmission, skipping at least a part of the data transmission, or otherwise not transmitting a part of the data transmission. In one aspect, in case of the NR-DC, the UE may determine to cancel transmitting at least a part of the data Tx/Rx in the first frequency band of the first band group and data Rx/Tx in the second frequency band of the second band group that overlap in time. In another aspect, in case of the NR-DC, UE may determine to cancel transmitting at least a part of the data Tx/Rx in the first frequency band of the first cell-group and data Rx/Tx in the second frequency band of the second cell-group that overlap in time. In another aspect, in case of the NR-CA with the NUL-SUL band pair, the UE may determine to cancel transmitting at least a part of the data Tx/Rx in the first frequency band of the NUL carrier and data Rx/Tx in the second frequency band of the SUL carrier that overlap in time.

Figure 7:
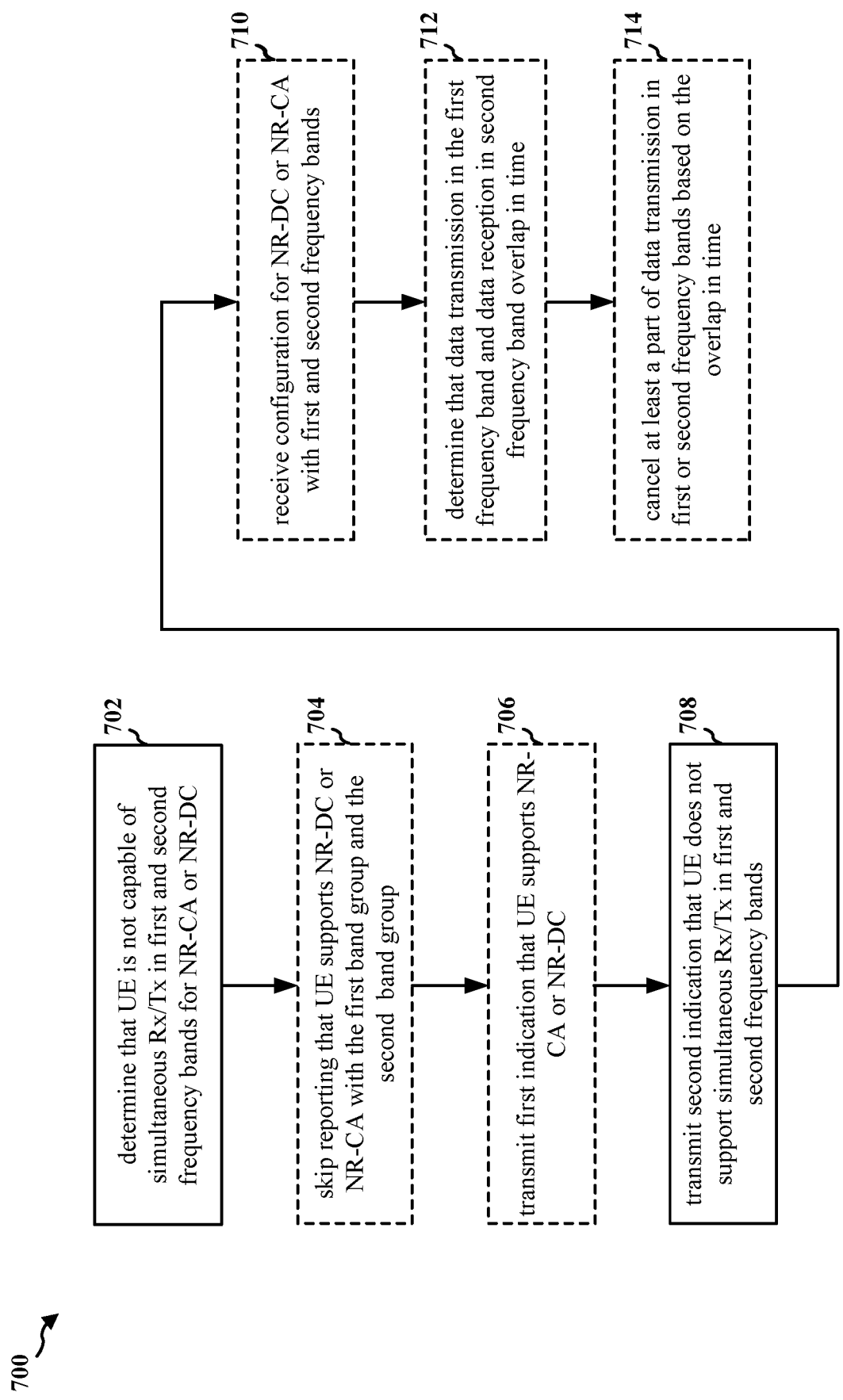
FIG. 7 is a flowchart of a method of wireless communication.

FIG. 7 is a flowchart 700 of a method of wireless communication. The method may be performed by a UE (e.g., the UE 104/602; the apparatus 1502). Optional aspects are shown with a dashed line. The method may enable the UE to provide the base station with improved capability information with respect to simultaneous Rx/Tx for a pair of frequency bands in connection with NR-DC and/or NR-CA, and/or to address the potential configuration and/or scheduling of simultaneous Rx/Tx that is not supported by the UE.

At 702, the UE determines that the UE may not be capable of simultaneous Rx/Tx in a first frequency band of a first band group and a second frequency band of a second band group for the NR-CA or the NR-DC. Various examples of potential combinations that may not be supported by the UE are described in connection with FIGS. 4-6. In one aspect, the UE may not be capable of supporting simultaneous data Rx/Tx via a first band of the first cell-group including the FR1 licensed FDD band and a second band of a second cell-group including one of a FR1 licensed TDD band, a FR1 unlicensed TDD band, or a FR2 band. In another aspect, the UE may not be capable of supporting simultaneous data Rx/Tx via a first band of the first band group including the FR1 licensed FDD band and a second band of the second band group including one of the FR1 licensed TDD band, the FR1 unlicensed TDD band, or the FR2 band. In another aspect, the UE may not be capable of supporting simultaneous data Rx/Tx via a first band having a NUL type in the FR1 licensed TDD band and a second band having a SUL type in the FR1 licensed FDD band of the same cell as the first band having the NUL type. For example, 702 may be performed by a multi carrier connection component 1540.

At 704, the UE may skip reporting to the base station that the UE supports the NR-DC or the NR-CA with the first frequency band in the first band group and the second frequency band in the second band group. Thus, in response to the determination, at 702, the UE may under report its capability for NR-DC or NR-CA, at 704, if the UE does not support simultaneous Rx/Tx for the pair of frequency bands. For example, 704 may be performed by the a multi carrier connection component 1540.

At 706, the UE may transmit, to the base station, a first indication that the UE may support the NR-CA with the multiple PUCCH groups or the NR-DC with the multiple cell groups. The indication may be provided in UE capability signaling to the base station, e.g., in RRC signaling. FIG. 6 illustrates an example of a UE 602 transmitting an indication 610 of support for NR-DC/NR-CA. For example, 706 may be performed by a radio access capability parameter component 1542.

At 708, the UE indicates, to the base station, that the UE may not be capable of the simultaneous Rx/Tx in the first frequency band and the second frequency band by sending a second indication that the UE may not support the simultaneous Rx/Tx in the first frequency band and the second frequency band. The indication may be provided in UE capability signaling to the base station, e.g., in RRC signaling. FIG. 6 illustrates an example of a UE 602 transmitting an indication 612 indicating the lack of support for the simultaneous Rx/Tx in a pair of frequency bands. In some aspects, the indication may indicate a lack of support for a parameter such as simultaneousRxTxInterBandCA and/or simultaneousTxSUL-NonSUL. In one aspect, the first indication may indicate that the UE may support the NR-DC, and the second indication may indicate that the UE may not support the simultaneous Rx/Tx the first frequency band and the second frequency band with at least one of the first frequency band and the second frequency band being a SUL carrier. For example, 708 may be performed by the radio access capability parameter component 1542.

At 710, the UE may receive the configuration for NR-DC or NR-CA with the first frequency band and the second frequency band from the base station. For example, the UE may receive a configuration for the NR-DC or the NR-CA based on the UE's capability to support NR-DC or NR-CA, even though the UE may not support simultaneous Rx/Tx for a first frequency band in a first band group (e.g. cell group/PUCCH group) and a second frequency band in a second band group (e.g. cell group/PUCCH group), e.g., as illustrated at 614 in FIG. 6. For example, 710 may be performed by the a multi carrier connection component 1540.

In one aspect, the UE may receive a configuration for the NR-DC with the first frequency band in a first cell group and the second frequency band in a second cell group based on the first indication indicating that the UE may support the NR-DC with the multiple cell groups. The UE may receive the configuration, from the base station, for the NR-DC with the first frequency band in a first cell group and the second frequency band in a second cell group.

In another aspect, the UE may receive a configuration for the NR-CA with the first frequency band in a first PUCCH group and the second frequency band in a second PUCCH group based on the first indication indicating that the UE may support the NR-CA with the multiple PUCCH groups. The UE may receive the configuration, from the base station, for the NR-CA with the first frequency band in a first PUCCH group and the second frequency band in a second PUCCH group.

In another aspect, the UE may receive a configuration for the NR-DC/NR-CA with the first frequency band in a first cell group and the second frequency band in a second cell group based on the first indication indicating that the UE may support the NR-DC/NR-CA and the second indication indicating that the UE may not support the simultaneous Rx/Tx the first frequency band and the second frequency band with at least one of the first frequency band and the second frequency band being a SUL carrier. The UE may receive the configuration, from the base station, for the NR-DC with the first frequency band in a first cell group and the second frequency band in a second cell group.

At 712, the UE may determine that data transmission in the first frequency band of the first band group and data reception in the second frequency band of the second band group overlap in time. The UE may receive scheduling information from the base station scheduling uplink and downlink communication that overlaps in time, for example. For example, 712 may be performed by a data Rx/Tx managing component 1544.

At 714, the UE may cancel at least a part of the data transmission in the first frequency band of the first band group or the data reception in the second frequency band of the second band group based on the overlap in time. In one aspect, in case of the NR-DC, the UE may determine to cancel transmitting at least a part of the data Tx/Rx in the first frequency band of the first band group and data Rx/Tx in the second frequency band of the second band group that overlap in time. In another aspect, in case of the NR-CA, UE may determine to cancel transmitting at least a part of the data Tx/Rx in the first frequency band of the first cell-group and data Rx/Tx in the second frequency band of the second cell-group that overlap in time. In another aspect, in case of the NR-CA with the NUL-SUL band pair, the UE may determine to cancel transmitting at least a part of the data Tx/Rx in the first frequency band of the NUL carrier and data Rx/Tx in the second frequency band of the SUL carrier that overlap in time. For example, 714 may be performed by the data Rx/Tx managing component 1544.

Figure 8:
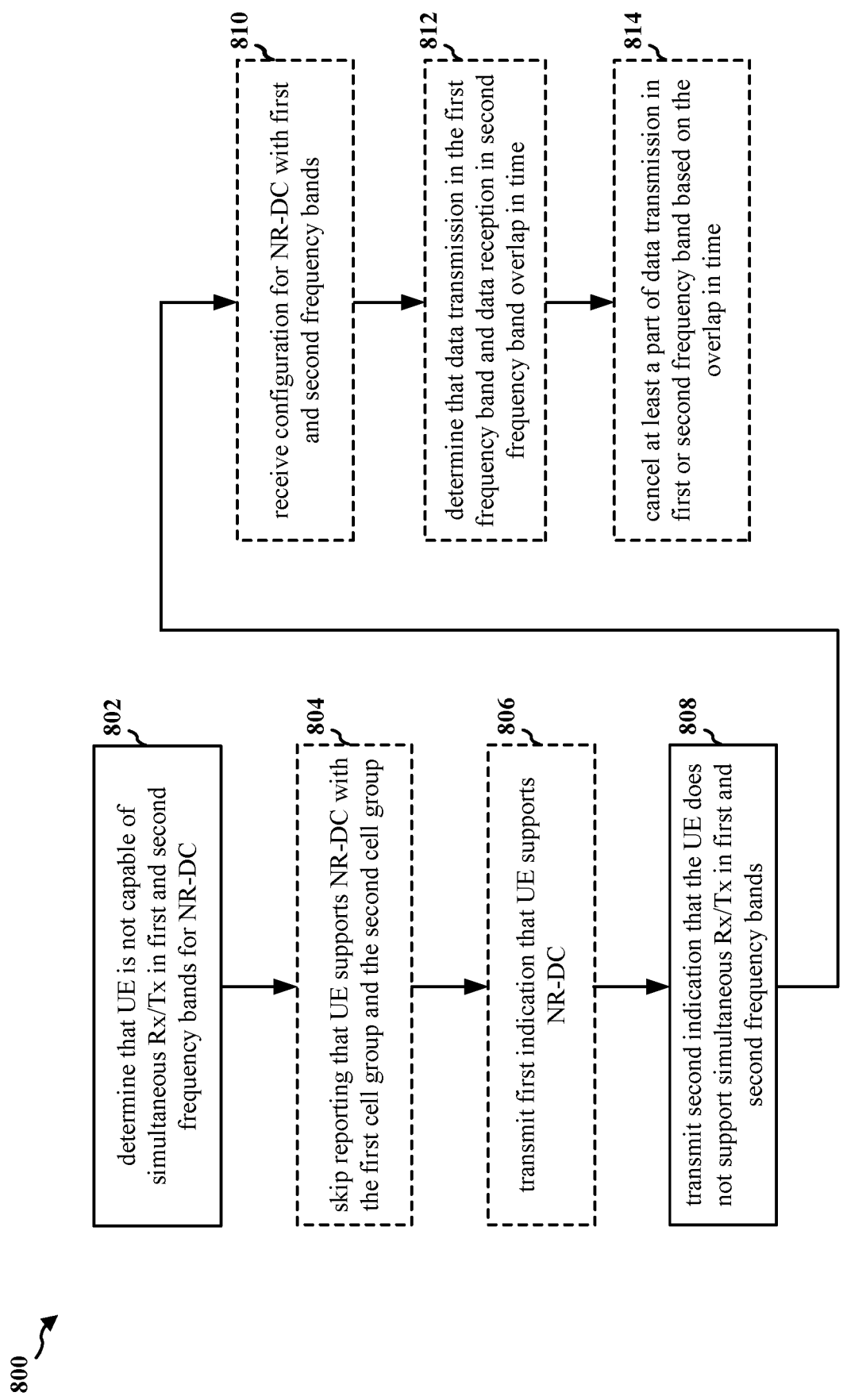
FIG. 8 is a flowchart of a method of wireless communication.

FIG. 8 is a flowchart 800 of a method of wireless communication. The method may be performed by a UE (e.g., the UE 104/602; the apparatus 1502). The method may enable the UE to provide the base station with improved capability information with respect to simultaneous Rx/Tx for a pair of frequency bands in connection with NR-DC, and/or to address the potential configuration and/or scheduling of simultaneous Rx/Tx that is not supported by the UE.

At 802, the UE determines that the UE may not be capable of simultaneous Rx/Tx in a first frequency band of a first band group and a second frequency band of a second band group for the NR-DC. Various examples of potential combinations that may not be supported by the UE are described in connection with FIGS. 4-6. In one aspect, the UE may not be capable of supporting simultaneous data Rx/Tx via a first band of the first cell-group including the FR1 licensed FDD band and a second band of a second cell-group including one of a FR1 licensed TDD band, a FR1 unlicensed TDD band, or a FR2 band. For example, 802 may be performed by a multi carrier connection component 1540.

At 804, the UE may skip reporting to the base station that the UE supports the NR-DC with the first frequency band in the first band group and the second frequency band in the second band group. Thus, in response to the determination, at 802, the UE may under report its capability for NR-DC, at 804, if the UE does not support simultaneous Rx/Tx for the pair of frequency bands. For example, 804 may be performed by the a multi carrier connection component 1540.

At 806, the UE may transmit, to the base station, a first indication that the UE may support the NR-DC with the multiple cell groups. The indication may be provided in UE capability signaling to the base station, e.g., in RRC signaling. FIG. 6 illustrates an example of a UE 602 transmitting an indication 610 of support for NR-DC/NR-CA. For example, 806 may be performed by a radio access capability parameter component 1542.

At 808, the UE indicates, to the base station, that the UE may not be capable of the simultaneous Rx/Tx in the first frequency band and the second frequency band by sending a second indication that the UE may not support the simultaneous Rx/Tx in the first frequency band and the second frequency band. The indication may be provided in UE capability signaling to the base station, e.g., in RRC signaling. FIG. 6 illustrates an example of a UE 602 transmitting an indication 612 indicating the lack of support for the simultaneous Rx/Tx in a pair of frequency bands. In some aspects, the indication may indicate a lack of support for a parameter such as simultaneousRxTxInterBandENDC. For example, 808 may be performed by the radio access capability parameter component 1542.

At 810, the UE may receive the configuration for NR-DC with the first frequency band and the second frequency band from the base station. For example, the UE may receive a configuration for the NR-DC based on the UE's capability to support NR-DC, even though the UE may not support simultaneous Rx/Tx for a first frequency band in a first band group, e.g., cell group and a second frequency band in a second band group, e.g. cell group, e.g., as illustrated at 614 in FIG. 6. In one aspect, the base station may transmit a configuration for the NR-DC with the first frequency band in a first cell group and the second frequency band in a second cell group based on the first indication indicating that the UE may support the NR-DC with the multiple cell groups. The UE may receive the configuration, from the base station, for the NR-DC with the first frequency band in a first cell group and the second frequency band in a second cell group. For example, 810 may be performed by the a multi carrier connection component 1540.

At 812, the UE may determine that data transmission in the first frequency band of the first band group and data reception in the second frequency band of the second band group overlap in time. The UE may receive scheduling information from the base station scheduling uplink and downlink communication that overlaps in time, for example. For example, 812 may be performed by a data Rx/Tx managing component 1544.

At 814, the UE may cancel at least a part of the data transmission in the first frequency band of the first band group or the data reception in the second frequency band of the second band group based on the overlap in time. In one aspect, in case of the NR-DC, the UE may determine to cancel transmitting at least a part of the data Tx/Rx in the first frequency band of the first band group and data Rx/Tx in the second frequency band of the second band group that overlap in time. For example, 814 may be performed by the data Rx/Tx managing component 1544.

Figure 9:
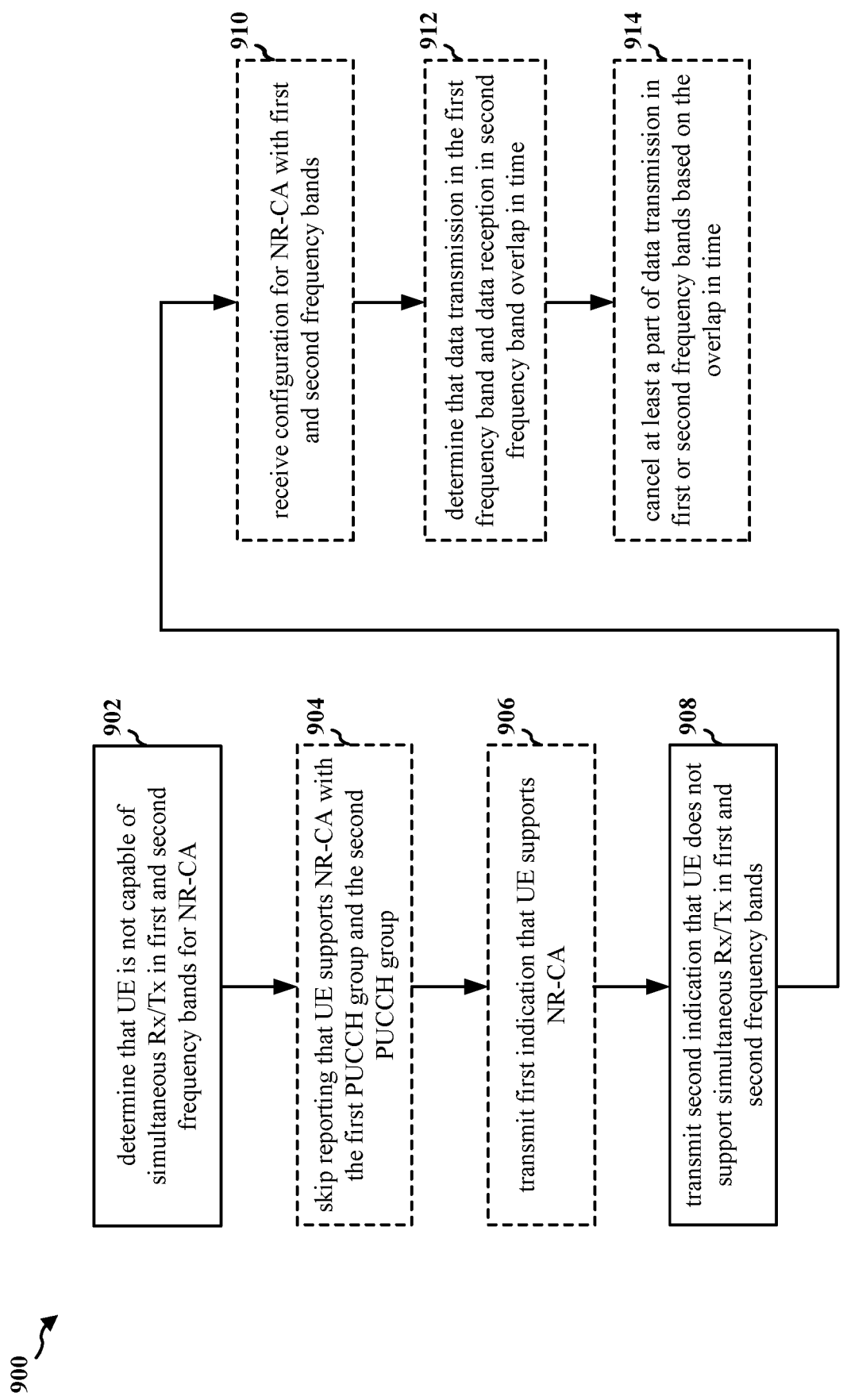
FIG. 9 is a flowchart of a method of wireless communication.

FIG. 9 is a flowchart 900 of a method of wireless communication. The method may be performed by a UE (e.g., the UE 104/602; the apparatus 1502). Optional aspects are shown with a dashed line. The method may enable the UE to provide the base station with improved capability information with respect to simultaneous Rx/Tx for a pair of frequency bands in connection with NR-CA, and/or to address the potential configuration and/or scheduling of simultaneous Rx/Tx that is not supported by the UE.

At 902, the UE determines that the UE may not be capable of simultaneous Rx/Tx in a first frequency band of a first band group and a second frequency band of a second band group for the NR-CA. Various examples of potential combinations that may not be supported by the UE are described in connection with FIGS. 4-6. In one aspect, the UE may not be capable of supporting simultaneous data Rx/Tx via a first band of the first band group including the FR1 licensed FDD band and a second band of the second band group including one of the FR1 licensed TDD band, the FR1 unlicensed TDD band, or the FR2 band. For example, 902 may be performed by a multi carrier connection component 1540.

At 904, the UE may skip reporting to the base station that the UE supports the NR-CA with the first frequency band in the first band group and the second frequency band in the second band group. Thus, in response to the determination, at 902, the UE may under report its capability for NR-CA, at 904, if the UE does not support simultaneous Rx/Tx for the pair of frequency bands. For example, 904 may be performed by the a multi carrier connection component 1540.

At 906, the UE may transmit, to the base station, a first indication that the UE may support the NR-CA with the multiple PUCCH groups. The indication may be provided in UE capability signaling to the base station, e.g., in RRC signaling. FIG. 6 illustrates an example of a UE 602 transmitting an indication 610 of support for NR-DC/NR-CA. For example, 906 may be performed by a radio access capability parameter component 1542.

At 908, the UE indicates, to the base station, that the UE may not be capable of the simultaneous Rx/Tx in the first frequency band and the second frequency band by sending a second indication that the UE may not support the simultaneous Rx/Tx in the first frequency band and the second frequency band. The indication may be provided in UE capability signaling to the base station, e.g., in RRC signaling. FIG. 6 illustrates an example of a UE 602 transmitting an indication 612 indicating the lack of support for the simultaneous Rx/Tx in a pair of frequency bands. In some aspects, the indication may indicate a lack of support for a parameter such as simultaneousRxTxInterBandCA. For example, 908 may be performed by the radio access capability parameter component 1542.

At 910, the UE may receive the configuration for NR-CA with the first frequency band and the second frequency band from the base station. For example, the UE may receive a configuration for the NR-DC or the NR-CA based on the UE's capability to support NR-CA, even though the UE may not support simultaneous Rx/Tx for a first frequency band in a first band group (e.g. cell group/PUCCH group) and a second frequency band in a second band group (e.g. cell group/PUCCH group), e.g., as illustrated at 614 in FIG. 6. In one aspect, the base station may transmit a configuration for the NR-CA with the first frequency band in a first PUCCH group and the second frequency band in a second PUCCH group based on the first indication indicating that the UE may support the NR-CA with the multiple PUCCH groups. The UE may receive the configuration, from the base station, for the NR-CA with the first frequency band in a first PUCCH group and the second frequency band in a second PUCCH group. For example, 910 may be performed by the a multi carrier connection component 1540.

At 912, the UE may determine that data transmission in the first frequency band of the first band group and data reception in the second frequency band of the second band group overlap in time. The UE may receive scheduling information from the base station scheduling uplink and downlink communication that overlaps in time, for example. For example, 912 may be performed by a data Rx/Tx managing component 1544.

At 914, the UE may cancel at least a part of the data transmission in the first frequency band of the first band group or the data reception in the second frequency band of the second band group based on the overlap in time. In another aspect, in case of the NR-CA, UE may determine to cancel transmitting at least a part of the data Tx/Rx in the first frequency band of the first PUCCH group and data Rx/Tx in the second frequency band of the second PUCCH group that overlap in time. For example, 914 may be performed by the data Rx/Tx managing component 1544.

Figure 10:
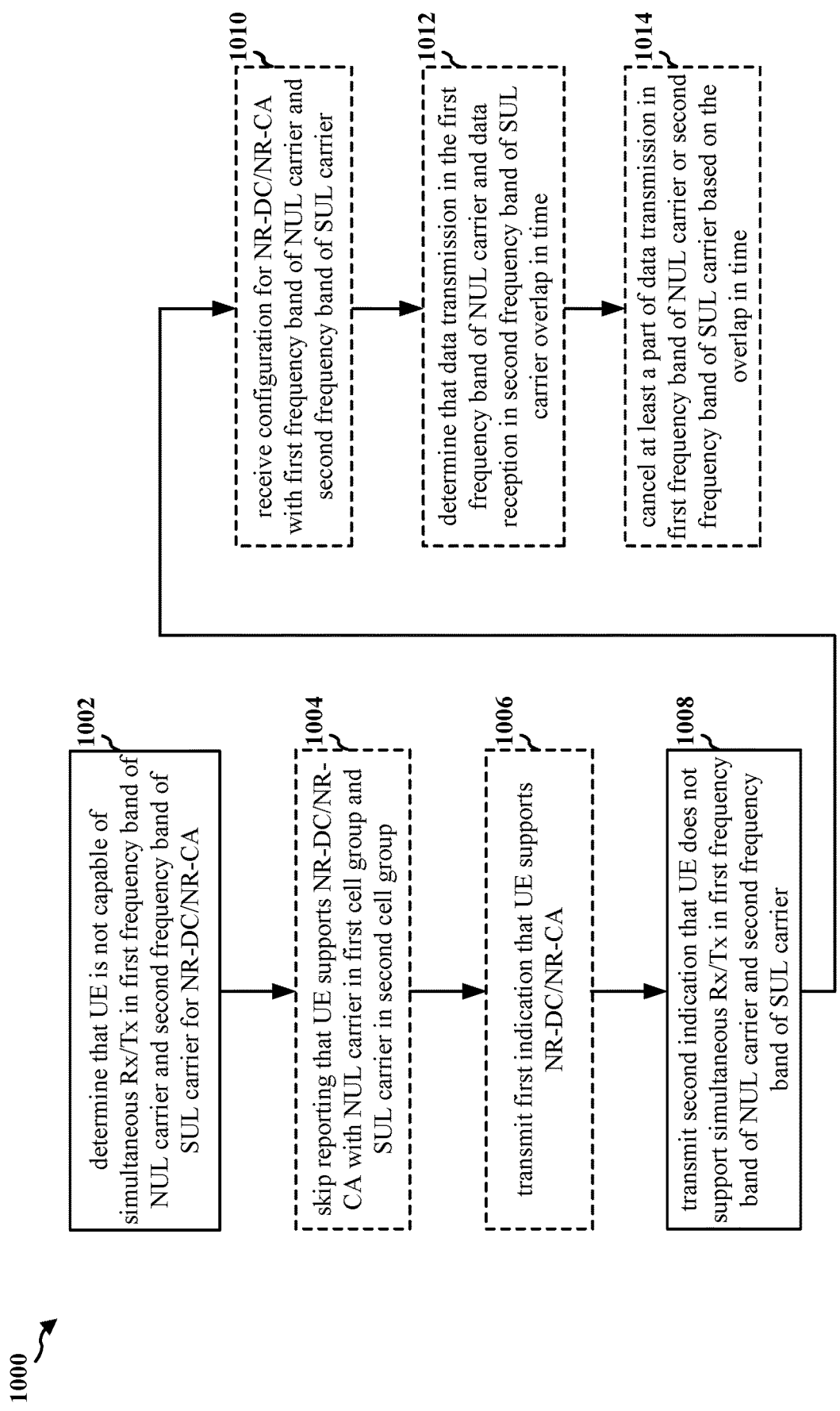
FIG. 10 is a flowchart of a method of wireless communication.

FIG. 10 is a flowchart 1000 of a method of wireless communication. The method may be performed by a UE (e.g., the UE 104/602; the apparatus 1502). Optional aspects are shown with a dashed line. The method may enable the UE to provide the base station with improved capability information with respect to simultaneous Rx/Tx for a pair of frequency bands in connection with NR-DC and/or NR-CA, and/or to address the potential configuration and/or scheduling of simultaneous Rx/Tx that is not supported by the UE.

At 1002, the UE determines that the UE may not be capable of simultaneous Rx/Tx in a first frequency band of a first band group and a second frequency band of a second band group for the NR-DC/NR-CA. Various examples of potential combinations that may not be supported by the UE are described in connection with FIGS. 4-6. In one aspect, the UE may not be capable of supporting simultaneous data Rx/Tx via a first band having a NUL type in the FR1 licensed TDD band and a second band having a SUL type in the FR1 licensed FDD band of the same cell as the first band having the NUL type. For example, 1002 may be performed by a multi carrier connection component 1540.

At 1004, the UE may skip reporting to the base station that the UE supports the NR-DC/NR-CA with the first frequency band in the first band group and the second frequency band in the second band group. Thus, in response to the determination, at 702, the UE may under report its capability for NR-DC or NR-CA, at 704, if the UE does not support simultaneous Rx/Tx for the pair of frequency bands. For example, 1004 may be performed by the a multi carrier connection component 1540.

At 1006, the UE may transmit, to the base station, a first indication that the UE may support the NR-DC/NR-CA with the multiple PUCCH groups. The indication may be provided in UE capability signaling to the base station, e.g., in RRC signaling. FIG. 6 illustrates an example of a UE 602 transmitting an indication 610 of support for NR-DC/NR-CA. For example, 1006 may be performed by a radio access capability parameter component 1542.

At 1008, the UE indicates, to the base station, that the UE may not be capable of the simultaneous Rx/Tx in the first frequency band and the second frequency band by sending a second indication that the UE may not support the simultaneous Rx/Tx in the first frequency band and the second frequency band. The indication may be provided in UE capability signaling to the base station, e.g., in RRC signaling. FIG. 6 illustrates an example of a UE 602 transmitting an indication 612 indicating the lack of support for the simultaneous Rx/Tx in a pair of frequency bands. In some aspects, the indication may indicate a lack of support for a parameter such as simultaneousTxSUL-NonSUL. In one aspect, the first indication may indicate that the UE may support the NR-DC, and the second indication may indicate that the UE may not support the simultaneous Rx/Tx the first frequency band and the second frequency band with at least one of the first frequency band and the second frequency band being a SUL carrier. For example, 1008 may be performed by the radio access capability parameter component 1542.

At 1010, the UE receives the configuration for NR-DC/NR-CA with the first frequency band and the second frequency band from the base station. For example, the UE may receive a configuration for the NR-DC or the NR-CA based on the UE's capability to support NR-DC or NR-CA, even though the UE may not support simultaneous Rx/Tx for a first frequency band in a first band group (e.g. cell group/PUCCH group) and a second frequency band in a second band group (e.g. cell group/PUCCH group), e.g., as illustrated at 614 in FIG. 6. In one aspect, the base station may transmit a configuration for the NR-DC with the first frequency band in a first cell group and the second frequency band in a second cell group based on the first indication indicating that the UE may support the NR-DC and the second indication indicating that the UE may not support the simultaneous Rx/Tx the first frequency band and the second frequency band with at least one of the first frequency band and the second frequency band being a SUL carrier. The UE may receive the configuration, from the base station, for the NR-DC with the first frequency band in a first cell group and the second frequency band in a second cell group. For example, 1010 may be performed by the a multi carrier connection component 1540.

At 1012, the UE determines that data transmission in the first frequency band of the first band group and data reception in the second frequency band of the second band group overlap in time. The UE may receive scheduling information from the base station scheduling uplink and downlink communication that overlaps in time, for example. For example, 1012 may be performed by a data Rx/Tx managing component 1544.

At 1014, the UE cancels at least a part of the data transmission in the first frequency band of the first band group or the data reception in the second frequency band of the second band group based on the overlap in time. In one aspect, in case of the NR-CA with the NUL-SUL band pair, the UE may determine to cancel transmitting at least a part of the data Tx/Rx in the first frequency band of the NUL carrier and data Rx/Tx in the second frequency band of the SUL carrier that overlap in time. For example, 1014 may be performed by the data Rx/Tx managing component 1544.

Figure 11:
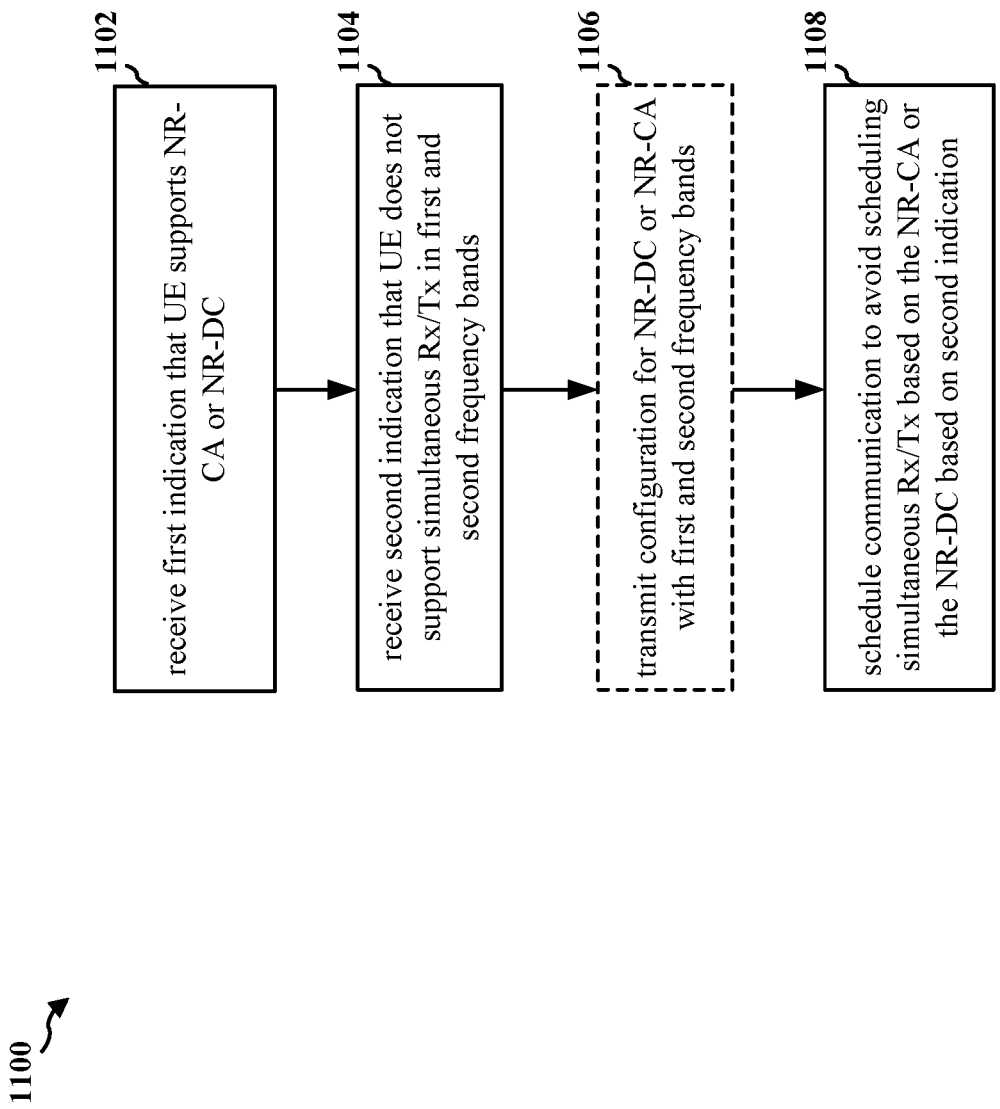
FIG. 11 is a flowchart of a method of wireless communication.

FIG. 11 is a flowchart 1100 of a method of wireless communication. The method may be performed by a base station (e.g., the base station 102/180/604; the apparatus 1602). Optional aspects are shown with a dashed line. The method may assist the base station in configuring a UE and/or in scheduling communication with a UE based on the UE's capabilities.

At 1102, the base station receives, from the UE, the first indication that the UE supports NR-CA with multiple PUCCH groups or NR-DC with multiple cell groups. The indication may be received in UE capability signaling to the base station, e.g., in RRC signaling. FIG. 6 illustrates an example of a base station 604 receiving an indication 610 of support for NR-DC/NR-CA from the UE 602. For example, 1102 may be performed by a multi carrier connection component 1640.

At 1104, the base station receives, from the UE, the second indication that the UE does not support simultaneous Rx/Tx in the first frequency band and the second frequency band. In one aspect, the first indication may indicate that the UE may support the NR-DC, and the second indication may indicate that the UE may not support the simultaneous Rx/Tx the first frequency band and the second frequency band with at least one of the first frequency band and the second frequency band being a SUL carrier. The indication may be received in UE capability signaling from the UE, e.g., in RRC signaling. FIG. 6 illustrates an example of a base station 604 receiving an indication 612 indicating the lack of support for the simultaneous Rx/Tx in a pair of frequency bands. In some aspects, the indication may indicate a lack of support for a parameter such as simultaneousRxTxInterBandCA and/or simultaneousTxSUL-Non-SUL. For example, 1104 may be performed by the multi carrier connection component 1640.

At 1106, the base station may transmit a configuration for NR-DC or NR-CA with the first frequency band and the second frequency band to the UE. For example, the base station may configure the UE for the NR-DC or the NR-CA based on the UE's capability to support NR-DC or NR-CA, even though the UE may not support simultaneous Rx/Tx for a first frequency band in a first band group (e.g. cell group/PUCCH group) and a second frequency band in a second band group (e.g. cell group/PUCCH group), e.g., as illustrated at 614 in FIG. 6. For example, 1106 may be performed by the multi carrier connection component 1640.

In one aspect, the base station may transmit a configuration for the NR-DC with the first frequency band in a first cell group and the second frequency band in a second cell group based on the first indication indicating that the UE may support the NR-DC with the multiple cell groups. The UE may receive the configuration, from the base station, for the NR-DC with the first frequency band in a first cell group and the second frequency band in a second cell group.

In another aspect, the base station may transmit a configuration for the NR-CA with the first frequency band in a first PUCCH group and the second frequency band in a second PUCCH group based on the first indication indicating that the UE may support the NR-CA with the multiple PUCCH groups. The UE may receive the configuration, from the base station, for the NR-CA with the first frequency band in a first PUCCH group and the second frequency band in a second PUCCH group.

In another aspect, the base station may transmit a configuration for the NR-DC/NR-CA with the first frequency band in a first cell group and the second frequency band in a second cell group based on the first indication indicating that the UE may support the NR-DC/NR-CA and the second indication indicating that the UE may not support the simultaneous Rx/Tx the first frequency band and the second frequency band with at least one of the first frequency band and the second frequency band being a SUL carrier. The UE may receive the configuration, from the base station, for the NR-DC with the first frequency band in a first cell group and the second frequency band in a second cell group.

At 1108, the base station schedules communication with the UE to avoid scheduling the simultaneous Rx/Tx based on the NR-CA or the NR-DC in at least the first frequency band of the first band group and the second frequency band of the second band group based on the second indication that the UE is not capable of the simultaneous Rx/Tx in the first frequency band and the second frequency band. For example, 1108 may be performed by a data Rx/Tx managing component 1644.

In some aspects, the first indication indicates that the UE may support the NR-DC. In one aspect, the base station may schedule the communication with the UE by avoiding scheduling the UE for simultaneous Rx/Tx the first frequency band in the first cell group and the second frequency band in the second cell group. In another aspect, the base station may schedule the communication with the UE by avoiding scheduling the UE for simultaneous Rx/Tx in a first cell group that includes the first frequency band and a second cell group that includes the second frequency band.

In some aspects, the first indication indicates that the UE may support the NR-CA. In one aspect, the base station may schedule the communication with the UE by avoiding scheduling the UE for simultaneous Rx/Tx the first frequency band in the first PUCCH group and the second frequency band in the second PUCCH group. In another aspect, the base station may schedule the communication with the UE by avoiding scheduling the UE for simultaneous Rx/Tx in a first PUCCH group that includes the first frequency band and a second PUCCH group that includes the second frequency band.

In some aspects, where the first indication indicates that the UE may support the NR-DC and the second indication indicates that the UE may not support the simultaneous Rx/Tx the first frequency band and the second frequency band with at least one of the first frequency band and the second frequency band being a SUL carrier. The base station may schedule the communication with the UE by avoiding scheduling the UE for simultaneous Rx/Tx the first frequency band as a first carrier type in a first cell group and the second frequency band as a second carrier type in a second cell group, the first carrier type being the SUL carrier and the second carrier type being a non-SUL carrier.

Figure 12:
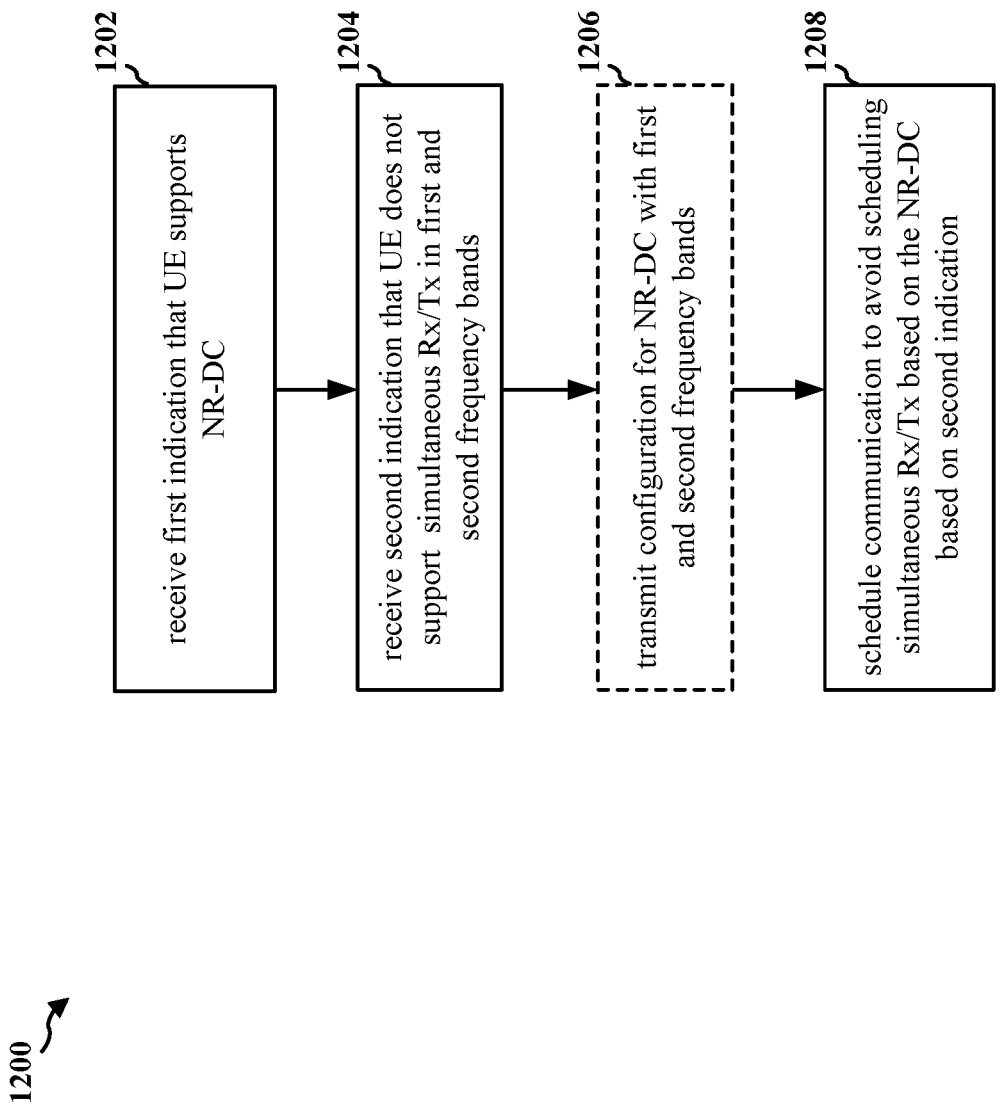
FIG. 12 is a flowchart of a method of wireless communication.

FIG. 12 is a flowchart 1200 of a method of wireless communication. The method may be performed by a base station (e.g., the base station 102/180/604; the apparatus 1602). Optional aspects are shown with a dashed line. The method may assist the base station in configuring a UE and/or in scheduling communication with a UE based on the UE's capabilities.

At 1202, the base station receives, from the UE, the first indication that the UE supports NR-DC with multiple cell groups. The indication may be received in UE capability signaling to the base station, e.g., in RRC signaling. FIG. 6 illustrates an example of a base station 604 receiving an indication 610 of support for NR-DC from the UE 602. For example, 1202 may be performed by a multi carrier connection component 1640.

At 1204, the base station receives, from the UE, the second indication that the UE does not support simultaneous Rx/Tx in the first frequency band and the second frequency band. The indication may be received in UE capability signaling from the UE, e.g., in RRC signaling. FIG. 6 illustrates an example of a base station 604 receiving an indication 612 indicating the lack of support for the simultaneous Rx/Tx in a pair of frequency bands. In some aspects, the indication may indicate a lack of support for a parameter such as simultaneousRxTxInterBandENDC. For example, 1204 may be performed by the multi carrier connection component 1640.

At 1206, the base station may transmit a configuration for NR-DC with the first frequency band and the second frequency band to the UE. For example, the base station may configure the UE for the NR-DC based on the UE's capability to support NR-DC, even though the UE may not support simultaneous Rx/Tx for a first frequency band in a first band group (e.g. cell group) and a second frequency band in a second band group (e.g. cell group), e.g., as illustrated at 614 in FIG. 6. In one aspect, the base station may transmit a configuration for the NR-DC with the first frequency band in a first cell group and the second frequency band in a second cell group based on the first indication indicating that the UE may support the NR-DC with the multiple cell groups. The UE may receive the configuration, from the base station, for the NR-DC with the first frequency band in a first cell group and the second frequency band in a second cell group. For example, 1206 may be performed by the multi carrier connection component 1640.

At 1208, the base station schedules communication with the UE to avoid scheduling the simultaneous Rx/Tx based on the NR-DC in at least the first frequency band of the first band group and the second frequency band of the second band group based on the second indication that the UE is not capable of the simultaneous Rx/Tx in the first frequency band and the second frequency band. In some aspects, the first indication indicates that the UE may support the NR-DC. In one aspect, the base station may schedule the communication with the UE by avoiding scheduling the UE for simultaneous Rx/Tx the first frequency band in the first cell group and the second frequency band in the second cell group. In one aspect, the base station may schedule the communication with the UE by avoiding scheduling the UE for simultaneous Rx/Tx in a first cell group that includes the first frequency band and a second cell group that includes the second frequency band. For example, 1208 may be performed by a data Rx/Tx managing component 1644.

Figure 13:
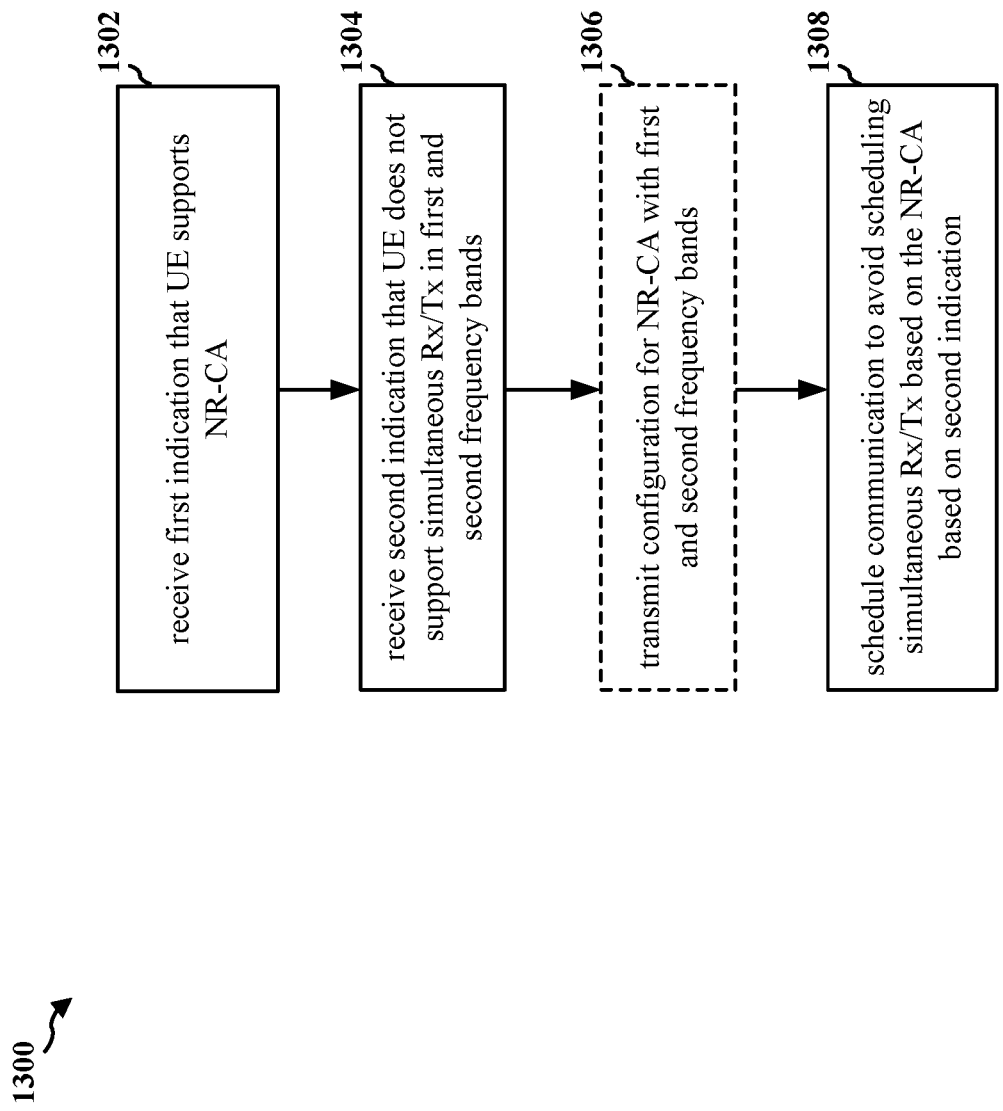
FIG. 13 is a flowchart of a method of wireless communication.

FIG. 13 is a flowchart 1300 of a method of wireless communication. The method may be performed by a base station (e.g., the base station 102/180/604; the apparatus 1602). Optional aspects are shown with a dashed line. The method may assist the base station in configuring a UE and/or in scheduling communication with a UE based on the UE's capabilities.

At 1302, the base station receives, from the UE, the first indication that the UE supports NR-CA with multiple PUCCH groups. The indication may be received in UE capability signaling to the base station, e.g., in RRC signaling. FIG. 6 illustrates an example of a base station 604 receiving an indication 610 of support for NR-CA from the UE 602. For example, 1302 may be performed by a multi carrier connection component 1640.

At 1304, the base station receives, from the UE, the second indication that the UE does not support simultaneous Rx/Tx in the first frequency band and the second frequency band. The indication may be received in UE capability signaling from the UE, e.g., in RRC signaling. FIG. 6 illustrates an example of a base station 604 receiving an indication 612 indicating the lack of support for the simultaneous Rx/Tx in a pair of frequency bands. In some aspects, the indication may indicate a lack of support for a parameter such as simultaneousRxTxInterBandCA. For example, 1304 may be performed by the multi carrier connection component 1640.

At 1306, the base station may transmit a configuration for NR-CA with the first frequency band and the second frequency band to the UE. For example, the base station may configure the UE for the NR-CA based on the UE's capability to support NR-CA, even though the UE may not support simultaneous Rx/Tx for a first frequency band in a first band group (e.g. PUCCH group) and a second frequency band in a second band group (e.g. PUCCH group), e.g., as illustrated at 614 in FIG. 6. In one aspect, the base station may transmit a configuration for the NR-CA with the first frequency band in a first PUCCH group and the second frequency band in a second PUCCH group based on the first indication indicating that the UE may support the NR-CA with the multiple PUCCH groups. The UE may receive the configuration, from the base station, for the NR-CA with the first frequency band in a first PUCCH group and the second frequency band in a second PUCCH group. For example, 1306 may be performed by the multi carrier connection component 1640.

At 1308, the base station schedules communication with the UE to avoid scheduling the simultaneous Rx/Tx based on the NR-CA in at least the first frequency band of the first band group and the second frequency band of the second band group based on the second indication that the UE is not capable of the simultaneous Rx/Tx in the first frequency band and the second frequency band. In some aspects, the first indication indicates that the UE may support the NR-CA. In one aspect, the base station may schedule the communication with the UE by avoiding scheduling the UE for simultaneous Rx/Tx the first frequency band in the first PUCCH group and the second frequency band in the second PUCCH group. In one aspect, the base station may schedule the communication with the UE by avoiding scheduling the UE for simultaneous Rx/Tx in a first PUCCH group that includes the first frequency band and a second PUCCH group that includes the second frequency band. For example, 1308 may be performed by a data Rx/Tx managing component 1644.

Figure 14:
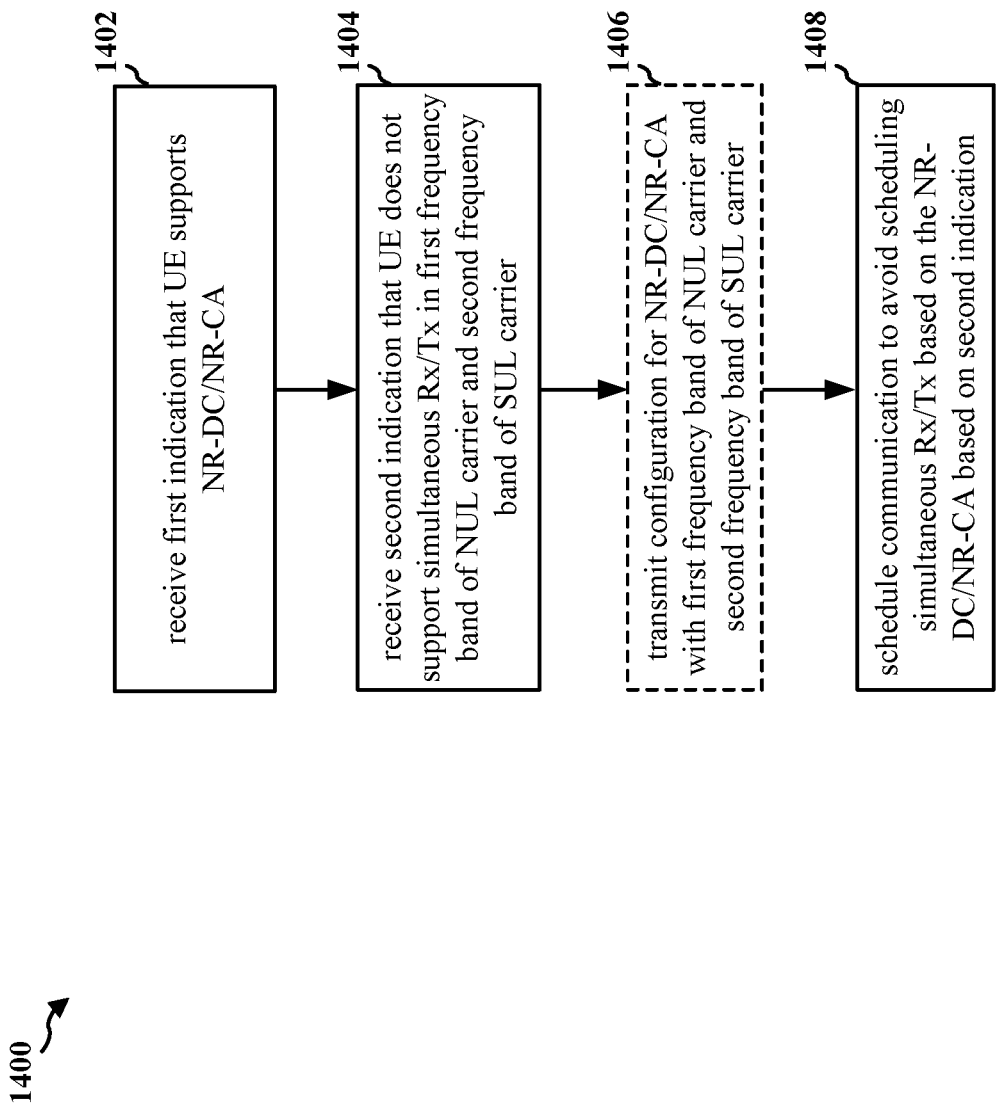
FIG. 14 is a flowchart of a method of wireless communication.

FIG. 14 is a flowchart 1400 of a method of wireless communication. The method may be performed by a base station (e.g., the base station 102/180/604; the apparatus 1602). Optional aspects are shown with a dashed line. The method may assist the base station in configuring a UE and/or in scheduling communication with a UE based on the UE's capabilities.

At 1402, the base station receives, from the UE, the first indication that the UE supports NR-DC/NR-CA with multiple cell groups. The indication may be received in UE capability signaling to the base station, e.g., in RRC signaling. FIG. 6 illustrates an example of a base station 604 receiving an indication 610 of support for NR-DC/NR-CA from the UE 602. For example, 1402 may be performed by a multi carrier connection component 1640.

At 1404, the base station receives, from the UE, the second indication that the UE does not support simultaneous Rx/Tx in the first frequency band and the second frequency band. In one aspect, the first indication may indicate that the UE may support the NR-DC/NR-CA, and the second indication may indicate that the UE may not support the simultaneous Rx/Tx the first frequency band and the second frequency band with at least one of the first frequency band and the second frequency band being a SUL carrier. The indication may be received in UE capability signaling from the UE, e.g., in RRC signaling. FIG. 6 illustrates an example of a base station 604 receiving an indication 612 indicating the lack of support for the simultaneous Rx/Tx in a pair of frequency bands. In some aspects, the indication may indicate a lack of support for a parameter such as simultaneousTxSUL-NonSUL. For example, 1404 may be performed by the multi carrier connection component 1640.

At 1406, the base station may transmit a configuration for NR-DC/NR-CA with the first frequency band and the second frequency band to the UE. For example, the base station may configure the UE for the NR-DC or the NR-CA based on the UE's capability to support NR-DC or NR-CA, even though the UE may not support simultaneous Rx/Tx for a first frequency band in a first band group (e.g. cell group/PUCCH group) and a second frequency band in a second band group (e.g. cell group/PUCCH group), e.g., as illustrated at 614 in FIG. 6. In one aspect, the base station may transmit a configuration for the NR-DC/NR-CA with the first frequency band in a first cell group and the second frequency band in a second cell group based on the first indication indicating that the UE may support the NR-DC/NR-CA and the second indication indicating that the UE may not support the simultaneous Rx/Tx the first frequency band and the second frequency band with at least one of the first frequency band and the second frequency band being a SUL carrier. The UE may receive the configuration, from the base station, for the NR-DC with the first frequency band in a first cell group and the second frequency band in a second cell group. For example, 1406 may be performed by the multi carrier connection component 1640.

At 1408, the base station schedules communication with the UE to avoid scheduling the simultaneous Rx/Tx based on the NR-DC in at least the first frequency band of the first band group and the second frequency band of the second band group based on the second indication that the UE is not capable of the simultaneous Rx/Tx in the first frequency band and the second frequency band. In some aspects, where the first indication indicates that the UE may support the NR-DC and the second indication indicates that the UE may not support the simultaneous Rx/Tx the first frequency band and the second frequency band with at least one of the first frequency band and the second frequency band being a SUL carrier. The base station may schedule the communication with the UE by avoiding scheduling the UE for simultaneous Rx/Tx the first frequency band as a first carrier type in a first cell group and the second frequency band as a second carrier type in a second cell group, the first carrier type being the SUL carrier and the second carrier type being a non-SUL carrier. For example, 1408 may be performed by a data Rx/Tx managing component 1644.

Figure 15:
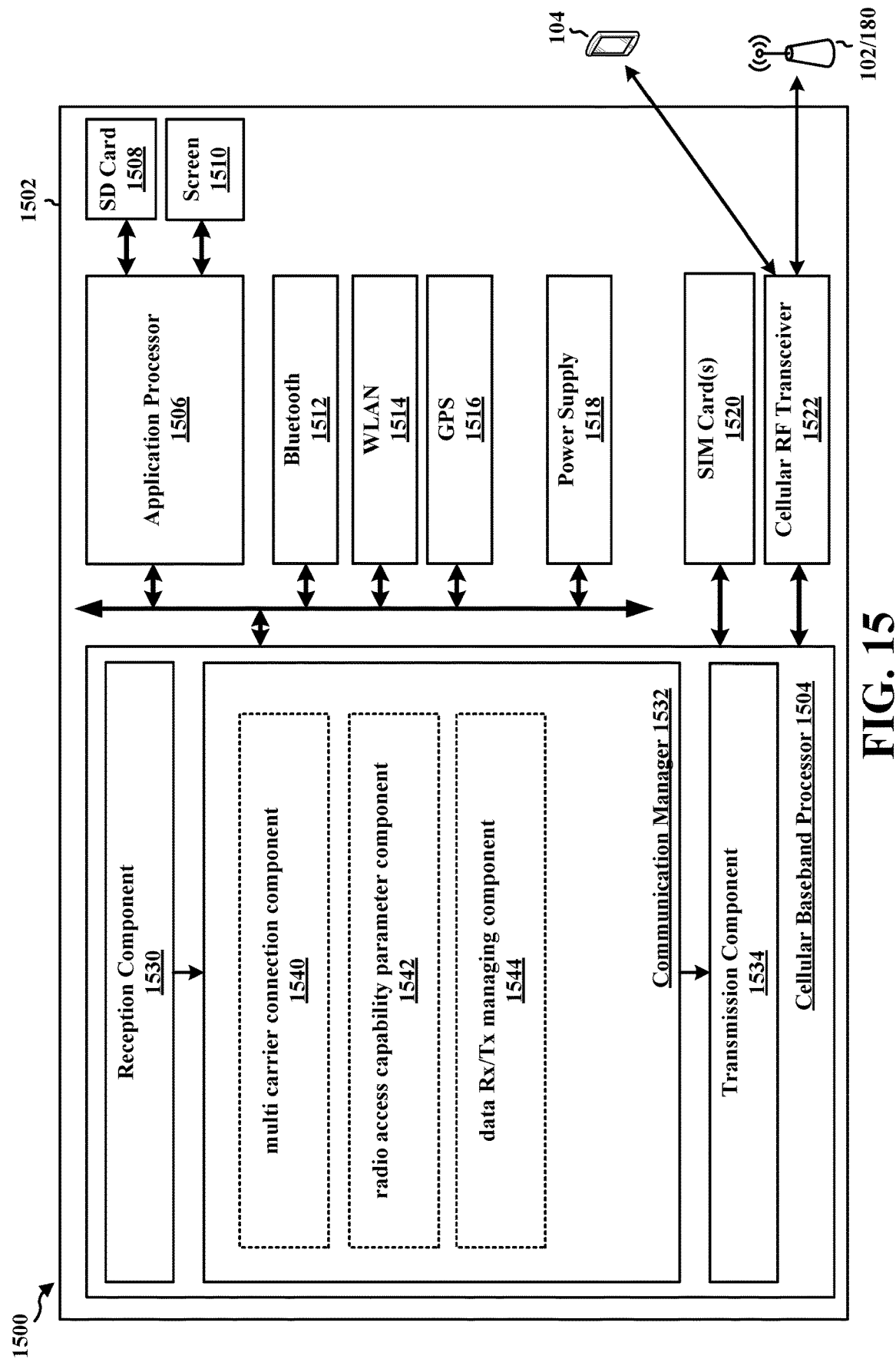
FIG. 15 is a diagram illustrating an example of a hardware implementation for an example apparatus.

FIG. 15 is a diagram 1500 illustrating an example of a hardware implementation for an apparatus 1502. The apparatus 1502 is a UE and includes a cellular baseband processor 1504 (also referred to as a modem) coupled to a cellular RF transceiver 1522 and one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, and a power supply 1518. The cellular baseband processor 1504 communicates through the cellular RF transceiver 1522 with the UE 104 and/or BS 102/180. The cellular baseband processor 1504 may include a computer-readable medium/memory. The computer-readable medium/memory may be non-transitory. The cellular baseband processor 1504 is responsible for general processing, including the execution of software stored on the computer-readable medium/memory. The software, when executed by the cellular baseband processor 1504, causes the cellular baseband processor 1504 to perform the various functions described supra. The computer-readable medium/memory may also be used for storing data that is manipulated by the cellular baseband processor 1504 when executing software. The cellular baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the cellular baseband processor 1504. The cellular baseband processor 1504 may be a component of the UE 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the aforediscussed additional modules of the apparatus 1502.

The communication manager 1532 includes a multi carrier connection component 1540 that is configured to determine that the UE may not be capable of simultaneous Rx/Tx in a first frequency band of a first band group and a second frequency band of a second band group for the NR-CA or the NR-DC, skip reporting to the base station that the UE supports the NR-DC or the NR-CA with the first frequency band in the first band group and the second frequency band in the second band group, and receive the configuration for NR-DC or NR-CA with the first frequency band and the second frequency band from the base station, e.g., as described in connection with 702, 704, 710, 802, 804, 810, 902, 904, 910, 1002, 1004, and 1010. The communication manager 1532 further includes a radio access capability parameter component 1542 that is configured to transmit, to the base station, a first indication that the UE may support the NR-CA with the multiple PUCCH groups or the NR-DC with the multiple cell groups, and indicate, to the base station, that the UE may not be capable of the simultaneous Rx/Tx in the first frequency band and the second frequency band by sending a second indication that the UE may not support the simultaneous Rx/Tx in the first frequency band and the second frequency band, e.g., as described in connection with 706, 708, 806, 808, 906, 908, 1006, and 1008. The communication manager 1532 further includes a data Rx/Tx managing component 1544 that is configured to determine that data transmission in the first frequency band of the first band group and data reception in the second frequency band of the second band group overlap in time, and cancel at least a part of the data transmission in the first frequency band of the first band group or the data reception in the second frequency band of the second band group based on the overlap in time, e.g., as described in connection with 712, 714, 812, 814, 912, 914, 1012, and 1014.

The apparatus may include additional components that perform each of the blocks of the algorithm in the aforementioned flowcharts of FIGS. 7, 8, 9, and 10. As such, each block in the aforementioned flowcharts of FIGS. 7, 8, 9, and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the cellular baseband processor 1504, includes means for determining that the UE is not capable of simultaneous Rx/Tx in a first frequency band of a first band group and a second frequency band of a second band group for the NR-CA or the NR-DC, means for indicating, to a base station, that the UE is not capable of the simultaneous Rx/Tx in the first frequency band and the second frequency band, and means for skipping reporting to the base station that the UE supports the NR-DC or the NR-CA with the first frequency band in the first band group and the second frequency band in the second band group. The apparatus 1502 includes means for transmitting, to the base station, a first indication that the UE supports the NR-CA with the multiple PUCCH groups or the NR-DC with the multiple cell groups, means for receiving a configuration, from the base station, for the NR-DC with the first frequency band in a first cell group and the second frequency band in a second cell group, and means for receiving a configuration, from the base station, for the NR-CA with the first frequency band in a first PUCCH group and the second frequency band in a second PUCCH group. The apparatus 1502 includes means for determining that data transmission in the first frequency band of the first band group and data reception in the second frequency band of the second band group overlap in time, and means for canceling at least a part of the data transmission in the first frequency band of the first band group or the data reception in the second frequency band of the second band group based on the overlap in time. The aforementioned means may be one or more of the aforementioned components of the apparatus 1502 configured to perform the functions recited by the aforementioned means. As described supra, the apparatus 1502 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 16:
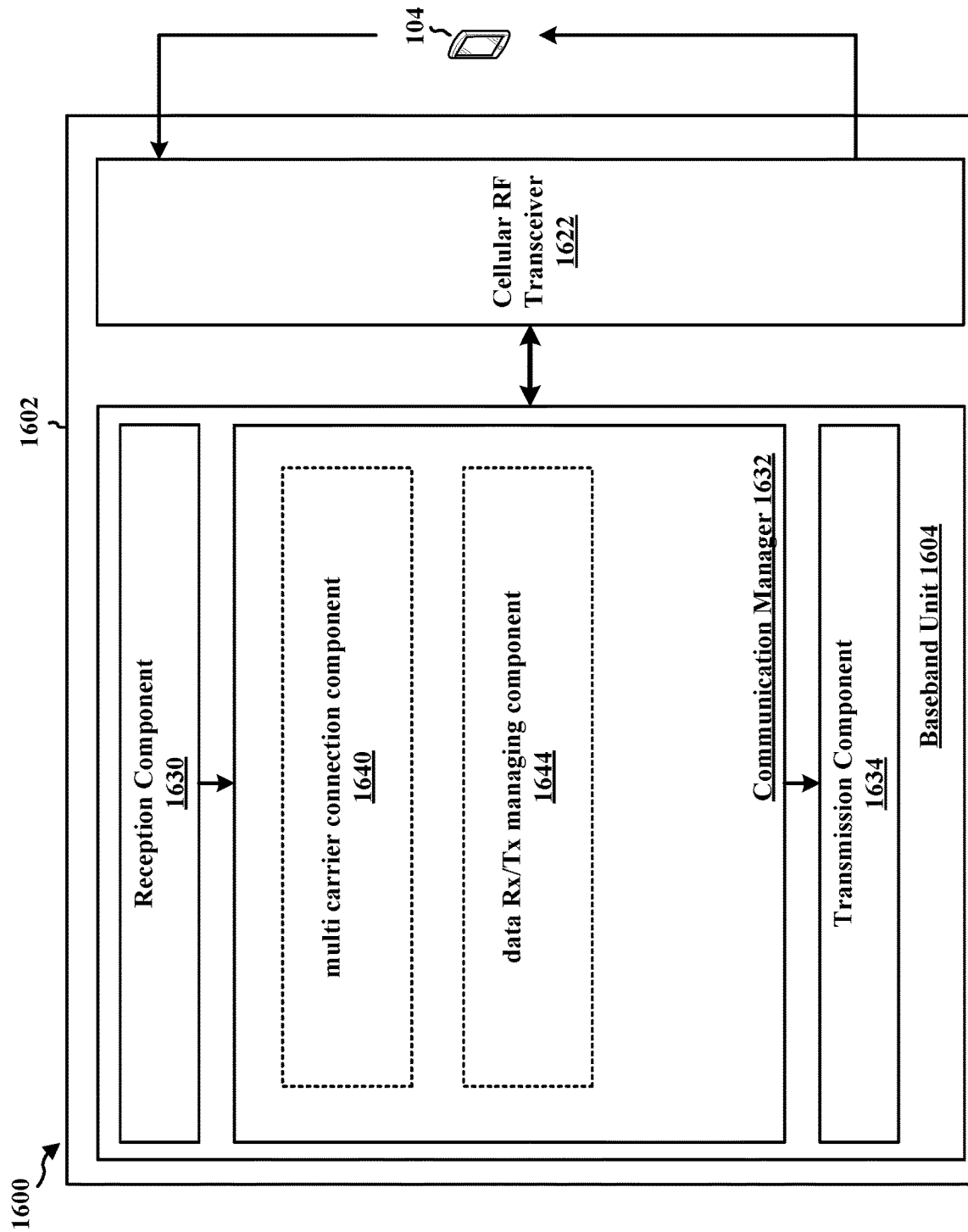
FIG. 16 is a diagram illustrating an example of a hardware implementation for an example apparatus.

FIG. 16 is a diagram 1600 illustrating an example of a hardware implementation for an apparatus 1602. The apparatus 1602 is a BS and includes a baseband unit 1604. The baseband unit 1604 may communicate through a cellular RF transceiver 1622 with the UE 104. The baseband unit 1604 may include a computer-readable medium—memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the base station 310 and may include the memory 376 and/or at least one of the TX processor 316, the RX processor 370, and the controller/processor 375.

The communication manager 1632 includes a multi carrier connection component 1640 that is configured to receive, from the UE, the first indication that the UE supports NR-CA with multiple PUCCH groups or NR-DC with multiple cell groups, receive, from the UE, the second indication that the UE does not support simultaneous Rx/Tx in the first frequency band and the second frequency band, and transmit a configuration for NR-DC or NR-CA with the first frequency band and the second frequency band to the UE, e.g., as described in connection with 1102, 1104, 1106, 1202, 1204, 1206, 1302, 1304, 1306, 1402, 1404, and 1406. The communication manager 1632 further includes a data Rx/Tx managing component 1644 that is configured to schedule communication with the UE to avoid scheduling the simultaneous Rx/Tx based on the NR-CA or the NR-DC in at least the first frequency band of the first band group and the second frequency band of the second band group, e.g., as described in connection with 1108, 1208, 1308, and 1408.

The apparatus may include additional components that perform each of the blocks of the algorithm in the aforementioned flowcharts of FIGS. 11, 12, 13, and 14. As such, each block in the aforementioned flowcharts of FIGS. 11, 12, 13, and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602, and in particular the baseband unit 1604, includes means for receiving, from a UE, a first indication that the UE supports NR-CA with multiple PUCCH groups or NR-DC with multiple cell groups, means for receiving, from the UE, a second indication that the UE does not support simultaneous Rx/Tx in a first frequency band and a second frequency band, and means for scheduling communication with the UE to avoid scheduling the simultaneous Rx/Tx based on the NR-CA or the NR-DC in at least the first frequency band of a first band group and the second frequency band of a second band group based on the second indication that the UE is not capable of the simultaneous Rx/Tx in the first frequency band and the second frequency band. The apparatus 1602 includes means for transmitting, to the UE, a configuration for the NR-DC with the first frequency band in a first cell group and the second frequency band in a second cell group, wherein scheduling the communication with the UE includes avoiding scheduling the UE for simultaneous Rx/Tx in the first frequency band and the second frequency band, means for transmitting, to the UE, a configuration for the NR-CA with the first frequency band in a first PUCCH group and the second frequency band in a second PUCCH group, wherein scheduling the communication with the UE includes avoiding scheduling the UE for simultaneous Rx/Tx in the first frequency band and the second frequency band, and means for transmitting, to the UE, a configuration for the NR-DC with the first frequency band in a first cell group and the second frequency band in a second cell group, wherein scheduling the communication with the UE includes avoiding scheduling the UE for simultaneous Rx/Tx in the first frequency band and the second frequency band. The aforementioned means may be one or more of the aforementioned components of the apparatus 1602 configured to perform the functions recited by the aforementioned means. As described supra, the apparatus 1602 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

A UE that supports NR-CA with multiple PUCCH groups or NR-DC with multiple cell groups may determine that the UE is not capable of simultaneous Rx/Tx in a first frequency band of a first band group and a second frequency band of a second band group for the NR-CA or the NR-DC. The UE may transmit a first indication that the UE supports the NR-CA with the multiple PUCCH groups or the NR-DC with the multiple cell groups, and a second indication that the UE does not support the simultaneous Rx/Tx in the first frequency band and the second frequency band. In one aspect, the UE may skip reporting to the base station that the UE supports the NR-DC or the NR-CA with the first frequency band in the first band group and the second frequency band in the second band group.

The base station may receive from the UE, the first indication that the UE supports NR-CA with multiple PUCCH groups or NR-DC with multiple cell groups, and the second indication that the UE does not support simultaneous Rx/Tx in the first frequency band and the second frequency band, and schedule communication with the UE to avoid scheduling the simultaneous Rx/Tx based on the NR-CA or the NR-DC in at least the first frequency band of a first band group and the second frequency band of a second band group based on the second indication that the UE is not capable of the simultaneous Rx/Tx in the first frequency band and the second frequency band.

In some aspects, first indication may indicate that the UE supports the NR-DC, and the second indication may indicate that the UE does not support the simultaneous Rx/Tx the first frequency band and the second frequency band with at least one of the first frequency band and the second frequency band being a supplementary uplink (SUL) carrier. In one aspect, the base station may schedule the communication with the UE by avoiding scheduling the UE for simultaneous Rx/Tx the first frequency band as a first carrier type in a first cell group and the second frequency band as a second carrier type in a second cell group, the first carrier type being the SUL carrier and the second carrier type being a non-SUL carrier. In another aspect, the base station may schedule the communication with the UE includes avoiding scheduling the UE for simultaneous Rx/Tx in a first cell group that includes the first frequency band and a second cell group that includes the second frequency band. In another aspect, the base station may schedule the communication with the UE includes avoiding scheduling the UE for simultaneous Rx/Tx in the first frequency band and the second frequency band.

In some aspects, the first indication may indicate that the UE supports the NR-DC with the multiple cell groups, and the UE may receive a configuration, from the base station, for the NR-DC with the first frequency band in a first cell group and the second frequency band in a second cell group. The base station may schedule the communication with the UE by avoiding scheduling the UE for simultaneous Rx/Tx in a first cell group that includes the first frequency band and a second cell group that includes the second frequency band or by avoiding scheduling the UE for simultaneous Rx/Tx in the first frequency band and the second frequency band.

In some aspects, the first indication may indicate that the UE supports the NR-CA with the multiple PUCCH groups, and the UE may receive a configuration, from the base station, for the NR-CA with the first frequency band in a first PUCCH group and the second frequency band in a second PUCCH group. The base station may schedule the communication with the UE includes avoiding scheduling the UE for simultaneous Rx/Tx in a first PUCCH group that includes the first frequency band and a second PUCCH group that includes the second frequency band, or by avoiding scheduling the UE for simultaneous Rx/Tx in the first frequency band and the second frequency band.

In some aspects, the UE may determine that data transmission in the first frequency band of the first band group and data reception in the second frequency band of the second band group overlap in time, and cancel at least a part of the data transmission in the first frequency band of the first band group or the data reception in the second frequency band of the second band group based on the overlap in time.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE that supports NR-CA with multiple PUCCH groups or NR-DC with multiple cell groups, the method including determining that the UE is not capable of simultaneous Rx/Tx in a first frequency band of a first band group and a second frequency band of a second band group for the NR-CA or the NR-DC, and indicating, to a base station, that the UE is not capable of the simultaneous Rx/Tx in the first frequency band and the second frequency band.

Aspect 2 is the method of aspect 1, further including skipping reporting to the base station that the UE supports the NR-DC or the NR-CA with the first frequency band in the first band group and the second frequency band in the second band group.

Aspect 3 is the method of any of aspects 1 and 2, further including transmitting, to the base station, a first indication that the UE supports the NR-CA with the multiple PUCCH groups or the NR-DC with the multiple cell groups, where the indicating that the UE is not capable of the simultaneous Rx/Tx includes transmitting, to the base station, a second indication that the UE does not support the simultaneous Rx/Tx in the first frequency band and the second frequency band.

Aspect 4 is the method of any of aspects 1 to 3, where the first indication indicates that the UE supports the NR-DC, and the second indication indicates that the UE does not support the simultaneous Rx/Tx the first frequency band and the second frequency band with at least one of the first frequency band and the second frequency band being a SUL carrier.

Aspect 5 is the method of aspect 4, where the first indication indicates that the UE supports the NR-DC with the multiple cell groups, the method further including receiving a configuration, from the base station, for the NR-DC with the first frequency band in a first cell group and the second frequency band in a second cell group.

Aspect 6 is the method of any of aspects 1 to 5, where the first indication indicates that the UE supports the NR-CA with the multiple PUCCH groups, the method further including receiving a configuration, from the base station, for the NR-CA with the first frequency band in a first PUCCH group and the second frequency band in a second PUCCH group.

Aspect 7 is the method of any of aspects 1 to 6, further including determining that data transmission in the first frequency band of the first band group and data reception in the second frequency band of the second band group overlap in time, and canceling at least a part of the data transmission in the first frequency band of the first band group or the data reception in the second frequency band of the second band group based on the overlap in time.

Aspect 8 is an apparatus for wireless communication including at least one processor coupled to a memory and configured to implement a method as in any of aspects 1 to 7.

Aspect 9 is an apparatus for wireless communication including means for implementing a method as in any of aspects 1 to 7.

Aspect 10 is a computer-readable medium storing computer executable code, where the code when executed by a processor causes the processor to implement a method as in any of aspects 1 to 7.

Aspect 11 is a method of wireless communication at a base station, including receiving, from the UE, a first indication that the UE supports NR-CA with multiple PUCCH groups or NR-DC with multiple cell groups, receiving, from the UE, a second indication that the UE does not support simultaneous Rx/Tx in a first frequency band and a second frequency band, and scheduling communication with the UE to avoid scheduling the simultaneous Rx/Tx based on the NR-CA or the NR-DC in at least the first frequency band of a first band group and the second frequency band of a second band group based on the second indication that the UE is not capable of the simultaneous Rx/Tx in the first frequency band and the second frequency band.

Aspect 12 is the method of aspect 11, where the first indication indicates that the UE supports the NR-DC, and scheduling the communication with the UE includes avoiding scheduling the UE for simultaneous Rx/Tx the first frequency band in a first cell group and the second frequency band in a second cell group.

Aspect 13 is the method of any of aspects 11 and 12, where the first indication indicates that the UE supports the NR-CA, and scheduling the communication with the UE includes avoiding scheduling the UE for simultaneous Rx/Tx the first frequency band in a first PUCCH group and the second frequency band in a second PUCCH group.

Aspect 14 is the method of any of aspects 11 to 13, where the first indication indicate s that the UE supports the NR-DC, and the second indication indicates that the UE does not support the simultaneous Rx/Tx the first frequency band and the second frequency band with at least one of the first frequency band and the second frequency band being a SUL carrier.

Aspect 15 is the method of aspect 14, where scheduling the communication with the UE includes avoiding scheduling the UE for simultaneous Rx/Tx the first frequency band as a first carrier type in a first cell group and the second frequency band as a second carrier type in a second cell group, the first carrier type being the SUL carrier and the second carrier type being a non-SUL carrier.

Aspect 16 is the method of any of aspects 11 to 15, where the first indication indicate s that the UE supports the NR-DC with the multiple cell groups, and scheduling the communication with the UE includes avoiding scheduling the UE for simultaneous Rx/Tx in a first cell group that includes the first frequency band and a second cell group that includes the second frequency band.

Aspect 17 is the method of any of aspects 11 to 16, where the first indication indicate s that the UE supports the NR-CA with the multiple PUCCH groups, and scheduling the communication with the UE includes avoiding scheduling the UE for simultaneous Rx/Tx in a first PUCCH group that includes the first frequency band and a second PUCCH group that includes the second frequency band.

Aspect 18 is the method of any of aspects 11 to 17, where the first indication indicate s that the UE supports the NR-DC, and the second indication indicates that the UE does not support the simultaneous Rx/Tx the first frequency band and the second frequency band with at least one of the first frequency band and the second frequency band being a SUL carrier, and where scheduling the communication with the UE include s avoiding scheduling the UE for simultaneous Rx/Tx in a first cell group that include s the first frequency band and a second cell group that includes the second frequency band.

Aspect 19 is the method of any of aspects 11 to 18, where the first indication indicates that the UE supports the NR-DC with the multiple cell groups, the method further including transmitting, to the UE, a configuration for the NR-DC with the first frequency band in a first cell group and the second frequency band in a second cell group, and scheduling the communication with the UE includes avoiding scheduling the UE for simultaneous Rx/Tx in the first frequency band and the second frequency band.

Aspect 20 is the method of any of aspects 11 to 19, where the first indication indicates that the UE supports the NR-CA with the multiple PUCCH groups, the method further including transmitting, to the UE, a configuration for the NR-CA with the first frequency band in a first PUCCH group and the second frequency band in a second PUCCH group, and scheduling the communication with the UE includes avoiding scheduling the UE for simultaneous Rx/Tx in the first frequency band and the second frequency band.

Aspect 21 is the method of any of aspects 11 to 20, where the first indication indicates that the UE supports the NR-DC, and the second indication indicates that the UE does not support the simultaneous Rx/Tx the first frequency band and the second frequency band with at least one of the first frequency band and the second frequency band being a supplementary uplink (SUL) carrier, the method further includes transmitting, to the UE, a configuration for the NR-DC with the first frequency band in a first cell group and the second frequency band in a second cell group, and scheduling the communication with the UE includes avoiding scheduling the UE for simultaneous Rx/Tx in the first frequency band and the second frequency band.

Aspect 22 is an apparatus for wireless communication including at least one processor coupled to a memory and configured to implement a method as in any of aspects 11 to 21.

Aspect 23 is an apparatus for wireless communication including means for implementing a method as in any of aspects 11 to 21.

Aspect 24 is a computer-readable medium storing computer executable code, where the code when executed by a processor causes the processor to implement a method as in any of aspects 11 to 21.

The invention claimed is:

1. An apparatus for wireless communication at a user equipment (UE) that supports new radio carrier aggregation (NR-CA) with multiple physical uplink control channel (PUCCH) groups or new radio dual connectivity (NR-DC) with multiple cell groups, comprising:
a memory; and
at least one processor coupled to the memory, wherein the at least one processor is configured to:
determine that the UE is not capable of simultaneous reception (Rx) and transmission (Tx) (Rx/Tx) in a first frequency band of a first band group and a second frequency band of a second band group for the NR-CA or the NR-DC;
indicate, to a base station based on the determination that the UE is not capable of the simultaneous Rx/Tx in the first frequency band of the first band group and the second frequency band of the second band group for the NR-CA or the NR-DC, that the UE is not capable of the simultaneous Rx/Tx in the first frequency band and the second frequency band; and
skip, based on the determination that the UE is not capable of the simultaneous Rx/Tx in the first frequency band and the second frequency band, reporting to the base station that the UE supports the NR-DC or the NR-CA with the first frequency band in the first band group and the second frequency band in the second band group.

2. An apparatus for wireless communication at a user equipment (UE) that supports new radio carrier aggregation (NR-CA) with multiple physical uplink control channel (PUCCH) groups or new radio dual connectivity (NR-DC) with multiple cell groups, comprising:
a memory; and
at least one processor coupled to the memory, wherein the at least one processor is configured to:
determine that the UE is not capable of simultaneous reception (Rx) and transmission (Tx) (Rx/Tx) in a first frequency band of a first band group and a second frequency band of a second band group for the NR-CA or the NR-DC;
transmit, to a base station, a first indication that the UE supports the NR-CA with the multiple PUCCH groups or the NR-DC with the multiple cell groups; and
transmit, to the base station based on the determination that the UE is not capable of the simultaneous Rx/Tx in the first frequency band of the first band group and the second frequency band of the second band group for the NR-CA or the NR-DC, a second indication that the UE does not support the simultaneous Rx/Tx in the first frequency band and the second frequency band.

3. The apparatus of claim 2, wherein the first indication indicates that the UE supports the NR-DC, and the second indication indicates that the UE does not support the simultaneous Rx/Tx the first frequency band and the second frequency band with at least one of the first frequency band and the second frequency band being a supplementary uplink (SUL) carrier.

4. The apparatus of claim 2, wherein the first indication indicates that the UE supports the NR-DC with the multiple cell groups, and
wherein the at least one processor is further configured to receive a configuration, from the base station, for the NR-DC with the first frequency band in a first cell group and the second frequency band in a second cell group.

5. The apparatus of claim 2, wherein the first indication indicates that the UE supports the NR-CA with the multiple PUCCH groups,
wherein the at least one processor is further configured to receive a configuration, from the base station, for the NR-CA with the first frequency band in a first PUCCH group and the second frequency band in a second PUCCH group.

6. The apparatus of claim 2, wherein the at least one processor is further configured to:
determine that data transmission in the first frequency band of the first band group and data reception in the second frequency band of the second band group overlap in time; and
cancel at least a part of the data transmission in the first frequency band of the first band group or the data reception in the second frequency band of the second band group based on the overlap in time.

7. A method of wireless communication at a user equipment (UE) that supports new radio carrier aggregation (NR-CA) with multiple physical uplink control channel (PUCCH) groups or new radio dual connectivity (NR-DC) with multiple cell groups, comprising:
- determining that the UE is not capable of simultaneous reception (Rx) and transmission (Tx) (Rx/Tx) in a first frequency band of a first band group and a second frequency band of a second band group for the NR-CA or the NR-DC;
- indicating, to a base station based on the determination that the UE is not capable of the simultaneous Rx/Tx in the first frequency band of the first band group and the second frequency band of the second band group for the NR-CA or the NR-DC, that the UE is not capable of the simultaneous Rx/Tx in the first frequency band and the second frequency band; and
- skipping, based on the determination that the UE is not capable of the simultaneous Rx/Tx in the first frequency band and the second frequency band, reporting to the base station that the UE supports the NR-DC or the NR-CA with the first frequency band in the first band group and the second frequency band in the second band group.

8. A method of wireless communication at a user equipment (UE) that supports new radio carrier aggregation (NR-CA) with multiple physical uplink control channel (PUCCH) groups or new radio dual connectivity (NR-DC) with multiple cell groups, comprising:
- determining that the UE is not capable of simultaneous reception (Rx) and transmission (Tx) (Rx/Tx) in a first frequency band of a first band group and a second frequency band of a second band group for the NR-CA or the NR-DC;
- transmitting, to a base station, a first indication that the UE supports the NR-CA with the multiple PUCCH groups or the NR-DC with the multiple cell groups; and
- transmitting, to the base station based on the determination that the UE is not capable of the simultaneous Rx/Tx in the first frequency band of the first band group and the second frequency band of the second band group for the NR-CA or the NR-DC, a second indication that the UE does not support the simultaneous Rx/Tx in the first frequency band and the second frequency band.

9. The method of claim 8, wherein the first indication indicates that the UE supports the NR-DC, and the second indication indicates that the UE does not support the simultaneous Rx/Tx the first frequency band and the second frequency band with at least one of the first frequency band and the second frequency band being a supplementary uplink (SUL) carrier.

10. The method of claim 8, wherein the first indication indicates that the UE supports the NR-DC with the multiple cell groups, the method further comprising:
- receiving a configuration, from the base station, for the NR-DC with the first frequency band in a first cell group and the second frequency band in a second cell group.

11. The method of claim 8, wherein the first indication indicates that the UE supports the NR-CA with the multiple PUCCH groups, the method further comprising:
- receiving a configuration, from the base station, for the NR-CA with the first frequency band in a first PUCCH group and the second frequency band in a second PUCCH group.

12. The method of claim 8, further comprising:
- determining that data transmission in the first frequency band of the first band group and data reception in the second frequency band of the second band group overlap in time; and
- canceling at least a part of the data transmission in the first frequency band of the first band group or the data reception in the second frequency band of the second band group based on the overlap in time.

13. An apparatus for wireless communication at a base station, comprising:
- a memory; and
- at least one processor coupled to the memory, wherein the at least one processor is [and] configured to:
  - receive, from a user equipment (UE), a first indication that the UE supports new radio carrier aggregation (NR-CA) with multiple physical uplink control channel (PUCCH) groups or new radio dual connectivity (NR-DC) with multiple cell groups;
  - receive, from the UE, a second indication that the UE does not support simultaneous reception (Rx) and transmission (Tx) (Rx/Tx) in a first frequency band and a second frequency band; and
  - schedule communication with the UE to avoid scheduling the simultaneous Rx/Tx based on the NR-CA or the NR-DC in at least the first frequency band of a first band group and the second frequency band of a second band group based on the second indication that the UE is not capable of the simultaneous Rx/Tx in the first frequency band and the second frequency band.

14. The apparatus of claim 13, wherein the first indication indicates that the UE supports the NR-DC, and
wherein, to schedule the communication with the UE, the at least one processor is configured to avoid scheduling the UE for simultaneous Rx/Tx the first frequency band in a first cell group and the second frequency band in a second cell group.

15. The apparatus of claim 13, wherein the first indication indicates that the UE supports the NR-CA, and
wherein, to schedule the communication with the UE, the at least one processor is configured to avoid scheduling the UE for simultaneous Rx/Tx the first frequency band in a first PUCCH group and the second frequency band in a second PUCCH group.

16. The apparatus of claim 13, wherein the first indication indicates that the UE supports the NR-DC, and the second indication indicates that the UE does not support the simultaneous Rx/Tx the first frequency band and the second frequency band with at least one of the first frequency band and the second frequency band being a supplementary uplink (SUL) carrier.

17. The apparatus of claim 16, wherein, to schedule the communication with the UE, the at least one processor is configured to avoid scheduling the UE for simultaneous Rx/Tx the first frequency band as a first carrier type in a first cell group and the second frequency band as a second carrier type in a second cell group, the first carrier type being the SUL carrier and the second carrier type being a non-SUL carrier.

18. The apparatus of claim 13, wherein the first indication indicates that the UE supports the NR-DC with the multiple cell groups, and
wherein, to schedule the communication with the UE, the at least one processor is configured to avoid scheduling the UE for simultaneous Rx/Tx in a first cell group that includes the first frequency band and a second cell group that includes the second frequency band.

19. The apparatus of claim 13, wherein the first indication indicates that the UE supports the NR-CA with the multiple PUCCH groups, and
  wherein, to schedule the communication with the UE, the at least one processor is configured to avoid scheduling the UE for simultaneous Rx/Tx in a first PUCCH group that includes the first frequency band and a second PUCCH group that includes the second frequency band.

20. The apparatus of claim 13, wherein the first indication indicates that the UE supports the NR-DC, and the second indication indicates that the UE does not support the simultaneous Rx/Tx the first frequency band and the second frequency band with at least one of the first frequency band and the second frequency band being a supplementary uplink (SUL) carrier, and
  wherein, to schedule the communication with the UE, the at least one processor is configured to avoid scheduling the UE for simultaneous Rx/Tx in a first cell group that includes the first frequency band and a second cell group that includes the second frequency band.

21. The apparatus of claim 13, wherein the first indication indicates that the UE supports the NR-DC with the multiple cell groups,
  wherein the at least one processor is further configured to transmit, to the UE, a configuration for the NR-DC with the first frequency band in a first cell group and the second frequency band in a second cell group, and
  wherein, to schedule the communication with the UE, the at least one processor is configured to avoid scheduling the UE for simultaneous Rx/Tx in the first frequency band and the second frequency band.

22. The apparatus of claim 13, wherein the first indication indicates that the UE supports the NR-CA with the multiple PUCCH groups,
  wherein the at least one processor is further configured to transmit, to the UE, a configuration for the NR-CA with the first frequency band in a first PUCCH group and the second frequency band in a second PUCCH group, and
  wherein, to schedule the communication with the UE, the at least one processor is configured to avoid scheduling the UE for simultaneous Rx/Tx in the first frequency band and the second frequency band.

23. The apparatus of claim 13, wherein the first indication indicates that the UE supports the NR-DC, and the second indication indicates that the UE does not support the simultaneous Rx/Tx the first frequency band and the second frequency band with at least one of the first frequency band and the second frequency band being a supplementary uplink (SUL) carrier,
  wherein the at least one processor is further configured to transmit, to the UE, configuration for the NR-DC with the first frequency band in a first cell group and the second frequency band in a second cell group, and
  wherein, to schedule the communication with the UE, the at least one processor is configured to avoid scheduling the UE for simultaneous Rx/Tx in the first frequency band and the second frequency band.

24. A method of wireless communication at a base station, comprising:
  receiving, from a user equipment (UE), a first indication that the UE supports new radio carrier aggregation (NR-CA) with multiple physical uplink control channel (PUCCH) groups or new radio dual connectivity (NR-DC) with multiple cell groups;
  receiving, from the UE, a second indication that the UE does not support simultaneous reception (Rx) and transmission (Tx) (Rx/Tx) in a first frequency band and a second frequency band; and
  scheduling communication with the UE to avoid scheduling the simultaneous Rx/Tx based on the NR-CA or the NR-DC in at least the first frequency band of a first band group and the second frequency band of a second band group based on the second indication that the UE is not capable of the simultaneous Rx/Tx in the first frequency band and the second frequency band.

25. The method of claim 24, wherein the first indication indicates that the UE supports the NR-DC, and scheduling the communication with the UE includes avoiding scheduling the UE for simultaneous Rx/Tx the first frequency band in a first cell group and the second frequency band in a second cell group.

26. The method of claim 24, wherein the first indication indicates that the UE supports the NR-CA, and scheduling the communication with the UE includes avoiding scheduling the UE for simultaneous Rx/Tx the first frequency band in a first PUCCH group and the second frequency band in a second PUCCH group.

27. The method of claim 24, wherein the first indication indicates that the UE supports the NR-DC, and the second indication indicates that the UE does not support the simultaneous Rx/Tx the first frequency band and the second frequency band with at least one of the first frequency band and the second frequency band being a supplementary uplink (SUL) carrier.

28. The method of claim 27, wherein scheduling the communication with the UE includes avoiding scheduling the UE for simultaneous Rx/Tx the first frequency band as a first carrier type in a first cell group and the second frequency band as a second carrier type in a second cell group, the first carrier type being the SUL carrier and the second carrier type being a non-SUL carrier.

29. The method of claim 24, wherein the first indication indicates that the UE supports the NR-DC with the multiple cell groups, and
  wherein scheduling the communication with the UE includes avoiding scheduling the UE for simultaneous Rx/Tx in a first cell group that includes the first frequency band and a second cell group that includes the second frequency band.

30. The method of claim 24, wherein the first indication indicates that the UE supports the NR-CA with the multiple PUCCH groups, and
  wherein scheduling the communication with the UE includes avoiding scheduling the UE for simultaneous Rx/Tx in a first PUCCH group that includes the first frequency band and a second PUCCH group that includes the second frequency band.

31. The method of claim 24, wherein the first indication indicates that the UE supports the NR-DC, and the second indication indicates that the UE does not support the simultaneous Rx/Tx the first frequency band and the second frequency band with at least one of the first frequency band and the second frequency band being a supplementary uplink (SUL) carrier, and
  wherein scheduling the communication with the UE includes avoiding scheduling the UE for simultaneous Rx/Tx in a first cell group that includes the first frequency band and a second cell group that includes the second frequency band.

32. The method of claim 24, wherein the first indication indicates that the UE supports the NR-DC with the multiple cell groups, the method further comprising:

transmitting, to the UE, a configuration for the NR-DC with the first frequency band in a first cell group and the second frequency band in a second cell group, wherein scheduling the communication with the UE includes avoiding scheduling the UE for simultaneous Rx/Tx in the first frequency band and the second frequency band.

33. The method of claim 24, wherein the first indication indicates that the UE supports the NR-CA with the multiple PUCCH groups, the method further comprising:

transmitting, to the UE, a configuration for the NR-CA with the first frequency band in a first PUCCH group and the second frequency band in a second PUCCH group, wherein scheduling the communication with the UE includes avoiding scheduling the UE for simultaneous Rx/Tx in the first frequency band and the second frequency band.

34. The method of claim 24, wherein the first indication indicates that the UE supports the NR-DC, and the second indication indicates that the UE does not support the simultaneous Rx/Tx the first frequency band and the second frequency band with at least one of the first frequency band and the second frequency band being a supplementary uplink (SUL) carrier, the method further comprises:

transmitting, to the UE, a configuration for the NR-DC with the first frequency band in a first cell group and the second frequency band in a second cell group, wherein scheduling the communication with the UE includes avoiding scheduling the UE for simultaneous Rx/Tx in the first frequency band and the second frequency band.

35. An apparatus for wireless communication, comprising:

means for receiving, from a user equipment (UE), a first indication that the UE supports new radio carrier aggregation (NR-CA) with multiple physical uplink control channel (PUCCH) groups or new radio dual connectivity (NR-DC) with multiple cell groups;

means for receiving, from the UE, a second indication that the UE does not support simultaneous reception (Rx) and transmission (Tx) (Rx/Tx) in a first frequency band and a second frequency band; and means for scheduling communication with the UE to avoid scheduling the simultaneous Rx/Tx based on the NR-CA or the NR-DC in at least the first frequency band of a first band group and the second frequency band of a second band group based on the second indication that the UE is not capable of the simultaneous Rx/Tx in the first frequency band and the second frequency band.

36. A non-transitory computer-readable medium having executable code stored thereon that, when executed by at least one processor of a base station, causes the base station to:

receive, from a user equipment (UE), a first indication that the UE supports new radio carrier aggregation (NR-CA) with multiple physical uplink control channel (PUCCH) groups or new radio dual connectivity (NR-DC) with multiple cell groups;

receive, from the UE, a second indication that the UE does not support simultaneous reception (Rx) and transmission (Tx) (Rx/Tx) in a first frequency band and a second frequency band; and schedule communication with the UE to avoid scheduling the simultaneous Rx/Tx based on the NR-CA or the NR-DC in at least the first frequency band of a first band group and the second frequency band of a second band group based on the second indication that the UE is not capable of the simultaneous Rx/Tx in the first frequency band and the second frequency band.

\* \* \* \* \*